(12) United States Patent
Fukumoto et al.

(10) Patent No.: US 12,473,526 B2
(45) Date of Patent: Nov. 18, 2025

(54) CELL CULTURE CONTROL DEVICE, CELL CULTURE DEVICE PROVIDED WITH SAME, CELL CULTURE CONTROL METHOD, AND CELL CULTURE CONTROL PROGRAM

(71) Applicant: PHC Holdings Corporation, Tokyo (JP)

(72) Inventors: Satoshi Fukumoto, Ehime (JP); Keisuke Taira, Ehime (JP); Shougo Fukushima, Osaka (JP); Tomoyoshi Tokumaru, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 556 days.

(21) Appl. No.: 18/103,960

(22) Filed: Jan. 31, 2023

(65) Prior Publication Data
US 2023/0174920 A1 Jun. 8, 2023

Related U.S. Application Data

(63) Continuation of application No. PCT/JP2021/046057, filed on Dec. 14, 2021.

(30) Foreign Application Priority Data

Feb. 1, 2021 (JP) ................. 2021-014583

(51) Int. Cl.
*C12M 1/36* (2006.01)
*C12M 1/00* (2006.01)
*C12M 1/34* (2006.01)

(52) U.S. Cl.
CPC ............ *C12M 41/48* (2013.01); *C12M 29/06* (2013.01); *C12M 41/32* (2013.01)

(58) Field of Classification Search
CPC ........ C12M 41/48; C12M 41/32; C12M 29/06
See application file for complete search history.

(56) References Cited

U.S. PATENT DOCUMENTS

| | | | |
|---|---|---|---|
| 9,783,774 B2 | 10/2017 | Namatame et al. | |
| 11,624,046 B2 * | 4/2023 | Nankervis | C12M 29/10 435/372.3 |

(Continued)

FOREIGN PATENT DOCUMENTS

| | | |
|---|---|---|
| EP | 2947140 A1 | 11/2015 |
| JP | H06-141844 A | 5/1994 |

(Continued)

OTHER PUBLICATIONS

International Search Report dated Feb. 15, 2022 issued in International Patent Application No. PCT/JP2021/046057, with English translation.

(Continued)

*Primary Examiner* — Michael L Hobbs
(74) *Attorney, Agent, or Firm* — Rimon P.C.

(57) ABSTRACT

A PC comprises a measurement unit, a consumption rate calculation unit, a culture medium replacement detection unit, and a next step transition determination unit. The measurement unit acquires the amount of consumed glucose from the result of continuously measuring the concentration of glucose contained in a culture medium (X) of a culture vessel. The consumption rate calculation unit calculates the consumption rate at which glucose is consumed by differentiating the amount of glucose consumed. The culture medium replacement detection unit detects that the culture medium (X) in the culture vessel has been replaced or added. When the culture medium (X) is replaced or added, the next step transition determination unit determines whether or not to proceed to the next step according to whether or not the consumption rate after the replacement or addition of the (Continued)

culture medium (X) calculated by the consumption rate calculation unit satisfies a specific condition.

18 Claims, 17 Drawing Sheets

(56) References Cited

U.S. PATENT DOCUMENTS

| | | | |
|---|---|---|---|
| 2015/0329817 | A1 | 11/2015 | Namatame et al. |
| 2015/0353882 | A1* | 12/2015 | Ando .................... C12M 41/26 435/404 |
| 2017/0130186 | A1 | 5/2017 | Berry et al. |
| 2017/0355947 | A9 | 12/2017 | Berry et al. |
| 2020/0231926 | A1 | 7/2020 | Murata |
| 2020/0392447 | A1 | 12/2020 | Berry et al. |
| 2022/0002657 | A1 | 1/2022 | Costa Farrando et al. |

FOREIGN PATENT DOCUMENTS

| | | |
|---|---|---|
| JP | 2007-244341 A | 9/2007 |
| JP | 2008-178344 A | 8/2008 |
| JP | 2015-216886 A | 12/2015 |
| JP | 2019-154343 A | 9/2019 |
| JP | 2020-124169 A | 8/2020 |
| WO | 2020/094809 A1 | 5/2020 |
| WO | 2020/162036 A1 | 8/2020 |

OTHER PUBLICATIONS

Extended European Search Report dated Apr. 30, 2024 issued in the corresponding European Patent Application No. 21923185.9.

* cited by examiner

CELL CULTURE CONTROL DEVICE, CELL CULTURE DEVICE PROVIDED WITH SAME, CELL CULTURE CONTROL METHOD, AND CELL CULTURE CONTROL PROGRAM

CROSS-REFERENCE OF RELATED APPLICATIONS

This application is a Continuation of International Patent Application No. PCT/JP2021/046057, filed on Dec. 14, 2021, which in turn claims the benefit of Japanese Patent Application No. 2021-014583, filed on Feb. 1, 2021, the entire disclosures of which Applications are incorporated by reference herein.

TECHNICAL FIELD

The present invention relates to a cell culture control device that controls a cell culture device, as well as a cell culture device provided with the same, a cell culture control method, and a cell culture control program.

DESCRIPTION OF THE RELATED ART

A conventional cell culture device manages the pressure of the gas phase located above the liquid surface of a culture solution containing cells that have been put in the culture chamber of a culture vessel. More specifically, a conventional cell culture device comprises a pressure sensor, a pump, an air pressure regulating valve, an air pressure regulating pipe, a flow rate regulator, and so on.

For example, Patent Literature 1 discloses a cell culture device comprising a culture vessel for culturing cells, an air supply unit for supplying a gas into the culture vessel, an exhaust unit for exhausting the gas in the culture vessel, and a pressure regulator for regulating the pressure inside the culture vessel.

CITATION LIST

Patent Literature

Patent Literature 1: JP-A 2019-154343

SUMMARY

Problem to be Solved by the Invention

However, the following problem was encountered with the above-mentioned conventional cell culture device.

Normally, cells cultured in a culture vessel increase by ingesting nutrients contained in the culture medium, and decrease as the nutrients contained in the culture medium diminish. In particular, it is known that the cells rapidly increase immediately after culture medium replacement, after which the increase slows and finally changes to a decrease.

However, if the cells contained in the culture vessel are in a state of overcrowding or a state of excessive metabolism, or in the presence of metabolites that have a negative effect (such as lactic acid), there is the risk that even if the culture is continued, the cells may not be cultured properly.

With the cell culture device disclosed in the above publication, it is determined whether or not to replace the liquid culture medium according to the progress of cell culture. However, although it is disclosed that the state of cells is observed until a specific number of days have elapsed, no consideration whatsoever is given to moving on to the next step at an appropriate time according to the state of cells.

It is object of the present invention to provide a cell culture control device with which it can be appropriately determined when to move on to the next step according to the state of the cells, as well as a cell culture device equipped with the same, a cell culture control method, and a cell culture control program.

Means for Solving Problem

The cell culture control device according to the first invention comprises a consumption amount information acquisition unit, a consumption rate calculation unit, a culture medium replacement detection unit, and a next step transition determination unit. The consumption amount information acquisition unit acquires the amount of consumed nutrients from the result of continuously measuring the concentration of nutrients contained in a medium contained in a culture vessel. The consumption rate calculation unit differentiates the amount of consumed nutrients acquired by the consumption amount information acquisition unit, and calculates the consumption rate at which the nutrients are consumed. The culture medium replacement detection unit detects that the culture medium contained in the culture vessel has been replaced or added. The next step transition determination unit determines whether or not to proceed to the next step according to whether or not the consumption rate after replacement or addition of the culture medium calculated by the consumption rate calculation unit satisfies a specific condition when the culture medium replacement detection unit detects that the culture medium has been replaced or added.

Here, after the culture medium is replaced or added, it is determined whether or not to end the current step and proceed to the next step according to whether or not the rate of consumption of nutrients, obtained by differentiating the amount of consumed nutrients acquired by continuously measuring the concentration of nutrients contained in the culture medium in the culture vessel, satisfies a specific condition.

Nutrients contained in the culture medium in the culture vessel include, for example, glucose, lactose, amino acids, and the like.

The replacement or addition of the culture medium contained in the culture vessel can be detected, for example, by detecting that the introduction pump and the discharge pump installed in the culture vessel have stopped after being driven.

The determination of whether or not to proceed to the next step is, for example, processing to determine whether to end the current step and proceed to the next culture step, after-treatment step, etc., and includes a step of determining whether or not to end cell culture.

In general, the rate of nutrient consumption and whether or not the cells cultured in a culture vessel are in the proper state are known to be correlated from the results of experiments and simulations, for example.

The rate of nutrient consumption is a numerical value obtained by differentiating the amount of consumed nutrients. For example, the rate at which nutrients decrease correlates with the rate at which cells increase.

The value obtained by differentiating the nutrient consumption includes the value obtained by arithmetically differentiating a function showing the relation between time and nutrient concentration, or the amount of change over time obtained by measuring the nutrient concentration at specific time intervals.

For example, when the culture medium is replaced or added, the old culture medium is replaced or fresh culture medium containing nutrients is added thereto, so if the cells are in a normal state, the rate of nutrient consumption will continue to increase from before the culture medium was replaced or replenished. On the other hand, in an abnormal state in which the cells are under some kind of stress, even after the culture medium has been replaced or added, there is the risk of a large difference in the consumption rate before and after the replacement or addition of the culture medium, or of a decrease in the consumption rate.

Consequently, after replacing or adding the culture medium, if it is determined whether to proceed to the next step according to whether the nutrient consumption rate obtained by differentiating the nutrient consumption satisfies a specific condition, it can be determined that the cells are in an abnormal state and the user can be prompted to proceed to the next step.

As a result, the user can appropriately determine when to proceed to the next step according to the state of the cells.

The cell culture control device according to a second invention is the cell culture control device according to the first invention, wherein the next step transition determination unit determines to proceed to the next step when the difference in the consumption rate before and after replacing or adding the culture medium is equal to or greater than a specific value.

Here, the fact that the difference in the consumption rate before and after replacing or adding the culture medium has a deviation of at least a specific value means that the cells may be under duress, such as when the cells are in a starved state before the culture medium is replaced, or the cells are in an excessive metabolic state after the culture medium is replaced or added.

Consequently, after replacing or adding the culture medium, if the cells are normal, the consumption rate will continue to increase from before the replacement or addition of the culture medium, but if it is detected that the consumption rate changes positively or negatively beyond a specific value, it can be determined that the cells are in an abnormal state, and the user can be prompted to proceed to the next step.

The cell culture control device according to a third invention is the cell culture control device according to the first invention, wherein the next step transition determination unit determines to proceed to the next step when the consumption rate becomes lower than immediately after replacing or adding the culture medium within a specific length of time.

Here, the fact that the glucose consumption rate falls immediately after culture medium replacement or addition means that the specific glucose consumption rate may drop (metabolism per cell may decrease) due, for example, to overcrowding of cells (overgrowth) even under an environment in which there are no metabolites (such as lactic acid) that would negatively affect cell culture due to culture medium replacement or addition.

Consequently, after replacement or addition of the culture medium, if the cells are normal, the consumption rate will continue to increase from before the culture medium was replaced or added, if it is detected that the consumption rate has decreased since immediately after the culture medium was replaced or added, it is determined that the cells are in an abnormal state and the user can be prompted to proceed to the next step.

The cell culture control device according to a fourth invention is the cell culture control device according to the first invention, further comprising a consumption acceleration calculation unit that differentiates the consumption rate calculated by the consumption rate calculation unit to calculate a consumption acceleration at which the nutrients are consumed. The next step transition determination unit determines to proceed to the next step when the consumption acceleration calculated by the consumption acceleration calculation unit becomes negative within a specific length of time.

Here, the fact that the acceleration of glucose consumption becomes negative immediately after culture medium replacement or addition means that the specific glucose consumption rate may have decreased (metabolism per cell may have decreased) due, for example, to overcrowding (overgrowth) of cells even under an environment in which there are no metabolites (such as lactic acid) that would negatively affect cell culture due to culture medium replacement or addition.

As a result, after replacing or adding the culture medium, if the cells are normal, the consumption acceleration continues to be positive from before the replacement or addition of the culture medium, but if it is detected that the consumption acceleration has become negative, it can be determined that the cells are in an abnormal state, and the user can be prompted to proceed to the next step.

The cell culture control device according to a fifth invention is the cell culture control device according to any of the second to fourth inventions, wherein the next step transition determination unit determines to proceed to the next step when the consumption rate after replacement or addition of the culture medium is equal to or greater than a specific value.

Consequently, if a condition that the consumption rate after replacement or addition of the culture medium be equal to or greater than a specific value is added to the above-mentioned condition for the consumption rate or consumption acceleration, then even if a sensor or the like that measures the concentration of nutrients has low resolution, for example, it can still be detected that the cells are in an abnormal state.

The cell culture control device according to a sixth invention is the cell culture control device according to any of the first to fifth inventions, further comprising a control unit that performs replacement or addition of the culture medium by controlling an introduction pump that supplies the culture medium to the culture vessel, and a discharge pump that discharges the culture medium from the culture vessel.

Consequently, the control unit can automatically control the replacement or addition of the culture medium in the culture vessel by controlling the introduction pump and the discharge pump installed in the culture vessel.

The cell culture control device according to a seventh invention is the cell culture control device according to the sixth invention, wherein the culture medium replacement detection unit detects that the culture medium has been replaced or added by detecting that the introduction pump and the discharge pump that have been driven to replace or add the culture medium contained in the culture vessel have stopped.

Consequently, it is possible to detect that the replacement or addition of the culture medium has ended by detecting that the introduction pump and the discharge pump that have started to be driven to replace or add the culture medium have stopped.

The cell culture control device according to the eighth invention is the cell culture control device according to the sixth or seventh invention, wherein the control unit performs replacement or addition of the culture medium once a specific preset length of time has elapsed.

Consequently, the replacement or addition of the culture medium in the culture vessel can be automatically controlled by driving the introduction pump and/or the discharge pump each time a specific preset length of time elapses.

The cell culture control device according to a ninth invention is the cell culture control device according to any of the first to eighth inventions, wherein the culture medium replacement detection unit detects that the culture medium has been replaced or added when there is an input to restart the measurement after the measurement of the nutrients has been paused.

Consequently, even with a configuration in which no introduction pump or discharge pump is installed, it is possible to detect that the replacement or addition of the culture medium has ended by detecting an input that restarts nutrient measurement from a paused state.

The cell culture control device according to a tenth invention is the cell culture control device according to any of the first to ninth inventions, further comprising a display unit that displays a message prompting the user to proceed to the next step when the next step transition determination unit determines to proceed to the next step.

Consequently, if text information, such as a message prompting the user to end the current step and proceed to the next step, is displayed on the display unit, the user can respond to this and proceed to the next step at the point when the cells enter an abnormal state after the culture medium is replaced or added.

The cell culture control device according to the eleventh invention is the cell culture control device according to any of the first to tenth inventions, further comprising a communication unit that transmits a notification prompting the user to proceed to the next step when the next step transition determination unit determines to proceed to the next step.

Consequently, if an e-mail or the like including a message prompting the user to end the current step and proceed to the next step is sent via the communication unit, the user can receive the email on a smartphone or the like and proceed to the next step at the point when the cells enter an abnormal state after the culture medium is replaced or added.

The cell culture control device according to the twelfth invention is the cell culture control device according to any of the first to eleventh inventions, further comprising a measurement unit that is connected to a sensor immersed in the culture medium contained in the culture vessel, and continuously measures the concentration of the nutrients.

Consequently, the concentration of nutrients contained in the culture medium can be continuously measured by the measurement unit connected to the sensor immersed in the culture medium in the culture vessel.

The cell culture control device according to the thirteenth invention is the cell culture control device according to any of the first to twelfth inventions, wherein, when the culture medium replacement detection unit detects that the culture medium contained in the culture vessel has been replaced, the consumption amount information acquisition unit calculates the amount of consumed nutrients on the basis of the concentration of the nutrients contained in the culture medium.

Consequently, when the culture medium in the culture vessel is replaced with fresh culture medium, there is no need to take into account the volume of the culture medium, so the nutrient consumption can be calculated on the basis of the nutrients contained in the culture medium.

The cell culture control device according to the fourteenth invention is the cell culture control device according to any of the first to twelfth inventions, wherein when the culture medium replacement detection unit detects that the culture medium contained in the culture vessel has been added, the consumption amount information acquisition unit calculates the amount of consumed nutrients on the basis of the concentration of the nutrients contained in the culture medium and the volume of the culture medium.

Consequently, when fresh culture medium is added to the culture medium in the culture vessel, the consumed amount of nutrients can be calculated very accurately by calculating the consumption of nutrients while taking into account the volume of the culture medium in addition to the nutrients contained in the culture medium.

The cell culture device according to the fifteenth invention comprises the cell culture control device according to any of the first to thirteenth inventions, an introduction pump that is controlled by the cell culture control device and supplies the culture medium to the culture vessel, and a discharge pump that is controlled by the cell culture control device and discharges the culture medium from the culture vessel.

Consequently, the replacement of the culture medium can be automatically controlled by controlling the introduction pump and the discharge pump installed in the culture vessel.

The cell culture control device according to the sixteenth invention comprises the cell culture control device according to fourteenth invention, and an introduction pump that is controlled by the cell culture control device and supplies the culture medium to the culture vessel.

Consequently, the culture medium can be automatically added to the culture vessel by controlling the introduction pump installed in the culture vessel.

The cell culture control method according to the seventeenth invention comprises a consumption amount information acquisition step, a consumption rate calculation step, a culture medium replacement detection step, and a next step transition determination step. The consumption amount information acquisition step involves acquiring the amount of consumed nutrients from the result of continuously measuring the concentration of the nutrients contained in the culture medium contained in the culture vessel. The consumption rate calculation step involves calculating the consumption rate at which the nutrients are consumed by differentiating the amount of consumed nutrients acquired in the consumption amount information acquisition step. The culture medium replacement detection step involves detecting that the culture medium contained in the culture vessel has been replaced or added. The next step transition determination step involves determining whether or not to proceed to the next step according to whether or not the consumption rate after replacement or addition of the culture medium calculated in the consumption rate calculation step satisfies a specific condition when it has been detected in the culture medium replacement detection step that the culture medium has been replaced or added.

Here, after the culture medium is replaced or added, it is determined whether or not to end the current step and proceed to the next step according to whether or not the consumption rate, obtained by differentiating the amount of nutrient consumption acquired by continuously measuring the concentration of nutrients contained in the culture medium in the culture vessel, satisfies a specific condition.

Nutrients contained in the culture medium in the culture vessel include, for example, glucose, lactose, amino acids, and the like.

The fact that culture medium contained in the culture vessel has been replaced or added can be detected, for example, by detecting that the introduction pump and the discharge pump installed in the culture vessel have stopped after being driven.

The determination of whether or not to proceed to the next step is, for example, processing to determine whether to end the current step and proceed to the next culture step, after-treatment step, etc., and includes a step of determining whether or not to end cell culture.

In general, the rate of nutrient consumption and whether or not the cells cultured in a culture vessel are in the proper state are known to be correlated from the results of experiments and simulations, for example.

The rate of nutrient consumption is a numerical value obtained by differentiating the amount of consumed nutrients. For example, the rate at which nutrients decrease correlates with the rate at which cells increase.

The value obtained by differentiating the nutrient consumption includes the value obtained by arithmetically differentiating a function showing the relation between time and nutrient concentration, or the amount of change over time obtained by measuring the nutrient concentration at specific time intervals.

For example, when the culture medium is replaced or added, the old culture medium is replaced or fresh culture medium containing nutrients is added thereto, so if the cells are in a normal state, the rate of nutrient consumption will continue to increase from before the culture medium was replaced or replenished. On the other hand, in an abnormal state in which the cells are under some kind of stress, even after the culture medium has been replaced or added, there is the risk of a large difference in the consumption rate before and after the replacement or addition of the culture medium, or of a decrease in the consumption rate.

Consequently, after replacing or adding the culture medium, if it is determined whether to proceed to the next step according to whether the nutrient consumption rate obtained by differentiating the nutrient consumption satisfies a specific condition, it can be determined that the cells are in an abnormal state and the user can be prompted to proceed to the next step.

As a result, the user can appropriately determine when to proceed to the next step according to the state of the cells.

The cell culture control program according to the eighteenth invention causes a computer to execute a cell culture control method comprising a consumption amount information acquisition step, a consumption rate calculation step, a culture medium replacement detection step, and a next step transition determination step. The consumption amount information acquisition step involves acquiring the amount of consumed nutrients from the result of continuously measuring the concentration of the nutrients contained in the culture medium in the culture vessel. The consumption rate calculation step involves calculating the consumption rate at which the nutrients are consumed by differentiating the amount of consumed nutrients acquired in the consumption amount information acquisition step. The culture medium replacement detection step involves detecting that the culture medium contained in the culture vessel has been replaced or added. The next step transition determination step involves determining whether or not to proceed to the next step according to whether or not the consumption rate after replacement or addition of the culture medium calculated in the consumption rate calculation step satisfies a specific condition when it has been detected in the culture medium replacement detection step that the culture medium has been replaced or added.

Here, after the culture medium is replaced or added, it is determined whether or not to end the current step and proceed to the next step according to whether or not the nutrient consumption rate obtained by differentiating the nutrient consumption amount acquired by continuously measuring the concentration of nutrients contained in the culture medium in the culture vessel, satisfies a specific condition.

Nutrients contained in the culture medium in the culture vessel include, for example, glucose, lactose, amino acids, and the like.

The replacement or addition of the culture medium contained in the culture vessel can be detected, for example, by detecting that the introduction pump and the discharge pump installed in the culture vessel have stopped after being driven.

The determination of whether or not to proceed to the next step is, for example, processing to determine whether to end the current step and proceed to the next culture step, after-treatment step, etc., and includes a step of determining whether or not to end cell culture.

In general, the rate of nutrient consumption and whether or not the cells cultured in a culture vessel are in the proper state are known to be correlated from the results of experiments and simulations, for example.

The rate of nutrient consumption is a numerical value obtained by differentiating the amount of consumed nutrients. For example, the rate at which nutrients decrease correlates with the rate at which cells increase.

The value obtained by differentiating the nutrient consumption includes the value obtained by arithmetically differentiating a function showing the relation between time and nutrient concentration, or the amount of change over time obtained by measuring the nutrient concentration at specific time intervals.

For example, when the culture medium is replaced or added, the old culture medium is replaced or fresh culture medium containing nutrients is added thereto, so if the cells are in a normal state, the rate of nutrient consumption will continue to increase from before the culture medium was replaced or replenished. On the other hand, in an abnormal state in which the cells are under some kind of stress, even after the culture medium has been replaced or added, there is the risk of a large difference in the consumption rate before and after the replacement or addition of the culture medium, or of a decrease in the consumption rate.

Consequently, after replacing or adding the culture medium, if it is determined whether to proceed to the next step according to whether the nutrient consumption rate obtained by differentiating the nutrient consumption satisfies a specific condition, it can be determined that the cells are in an abnormal state and the user can be prompted to proceed to the next step.

As a result, the user can appropriately determine when to proceed to the next step according to the state of the cells.
(Effects)

With the cell culture control device according to the present invention, it is possible to appropriately determine when to proceed to the next step according to the state of the cells.

DETAILED DESCRIPTION OF THE EMBODIMENT

Embodiment 1

A PC (personal computer) (cell culture control device) 10 and a cell culture device 50 equipped with this PC according to an embodiment of the present invention will now be described with reference to FIGS. 1 to 8.

(1) Cell Culture Device 50

Figure 1:
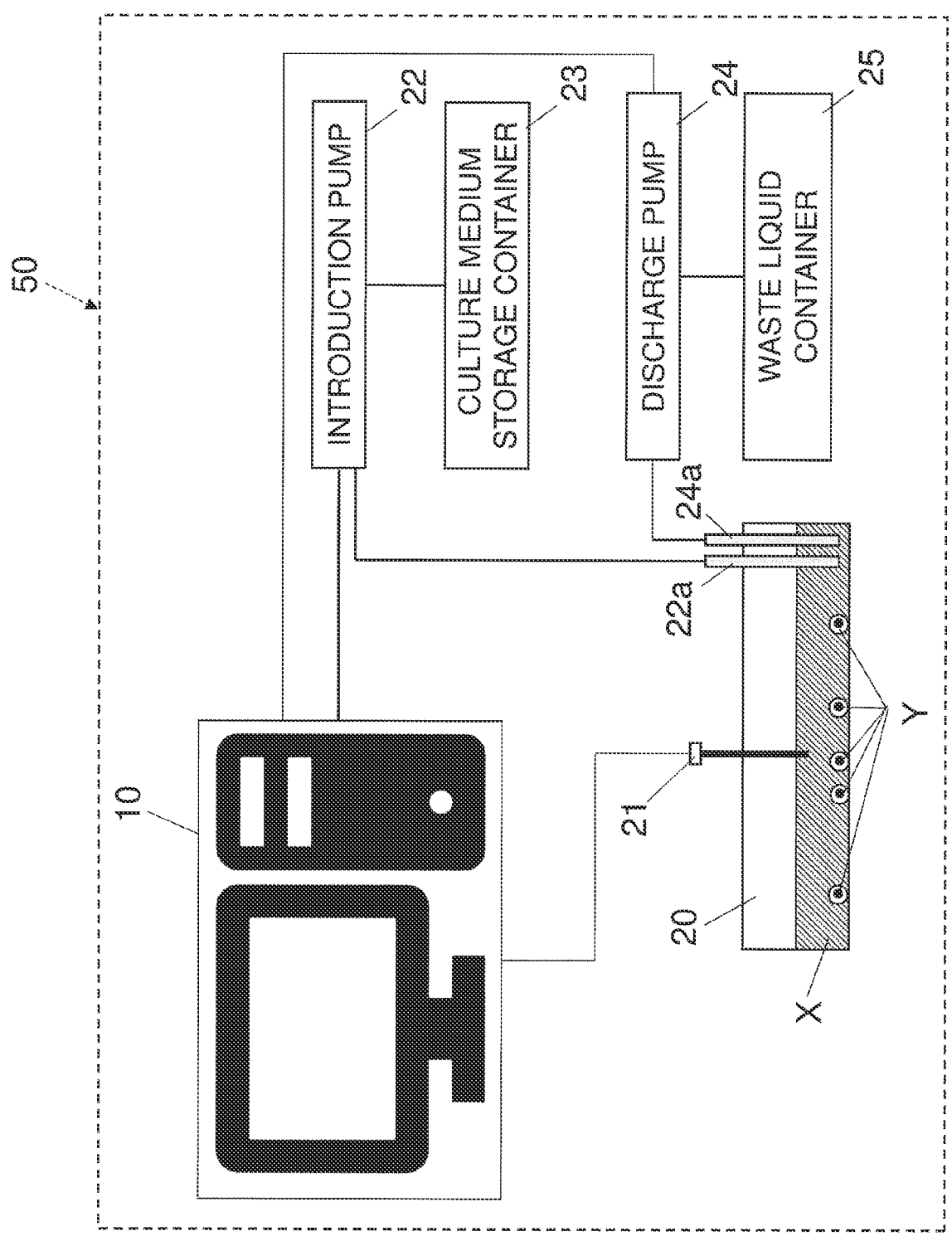
FIG. 1 is a schematic diagram of the configuration of a cell culture device including a PC according to an embodiment of the present invention.

As shown in FIG. 1, the cell culture device 50 of this embodiment comprises the PC (cell culture control device) 10, a culture vessel 20, a sensor 21, an introduction pump 22, a culture medium storage container 23, a discharge pump 24, and a waste liquid container 25.

As shown in FIG. 1, the PC 10 is connected to the sensor 21, the introduction pump 22, and the discharge pump 24, measures the concentration of glucose (nutrient) sensed by the sensor 21 to estimate the cultivation status of cells Y (cell count), and controls the introduction pump 22 and the discharge pump 24 to introduce or discharge the culture medium X placed into or from the culture vessel 20.

The internal configuration of the PC 10 will be detailed later.

The culture vessel 20 contains a culture medium X containing nutrients such as glucose, and cells Y to be cultured while consuming the glucose. The culture medium X in the culture vessel 20 is replaced according to the cell culture status (glucose consumption status).

The sensor 21 is disposed in a state of being immersed in the culture medium X contained in the culture vessel 20, and has measurement electrodes (working electrode, counter electrode, reference electrode) disposed on the immersed portion. A specific voltage is applied to the measurement electrodes of the sensor 21 immersed in the culture medium X, allowing the concentration of a specific component (glucose or the like) contained in the culture medium X to be measured electrochemically.

When measuring the concentration of glucose in the culture medium X, a reagent layer immobilized on the surface of the working electrode can contain a glucose oxidase, such as glucose oxidase (GOx) or glucose dehydrogenase (GDH), as well as a redox mediator.

The concentration of glucose is measured as follows. The glucose that has permeated from the culture medium X through a protective film is oxidized in a reaction with an enzyme (such as GOx or GDH) in the reagent layer to become gluconolactone, and a redox mediator reductant generated at the same time, or the electrons generated by an oxidation reaction of hydrogen peroxide are converted into an electrical current value.

As shown in FIG. 1, the introduction pump 22 introduces the culture medium X contained in the culture medium storage container 23 into the culture vessel 20 through an introduction port 22a when starting cell culture or when replacing the culture medium X in the culture vessel 20.

The culture medium storage container 23 is a container that holds the culture medium X to be introduced into the culture vessel 20, and holds the culture medium X containing nutrients such as glucose.

As shown in FIG. 1, the discharge pump 24 discharges the culture medium X into the waste liquid container 25 through the discharge port 24a installed in the culture vessel 20 in order to replace the culture medium X contained in the culture vessel 20.

The waste liquid container 25 holds the culture medium X that has been collected by the discharge pump 24 after nutrients such as glucose have been consumed by cell culture in the culture vessel 20.

(2) PC 10

The PC 10 measures the concentration of glucose contained in the culture medium X in the culture vessel 20 by means of the sensor 21 included in the cell culture device 50, and controls the introduction pump 22 and the discharge pump 24 so that the culture medium X is replaced according to the state of cell culture (the glucose consumption state).

Figure 2:
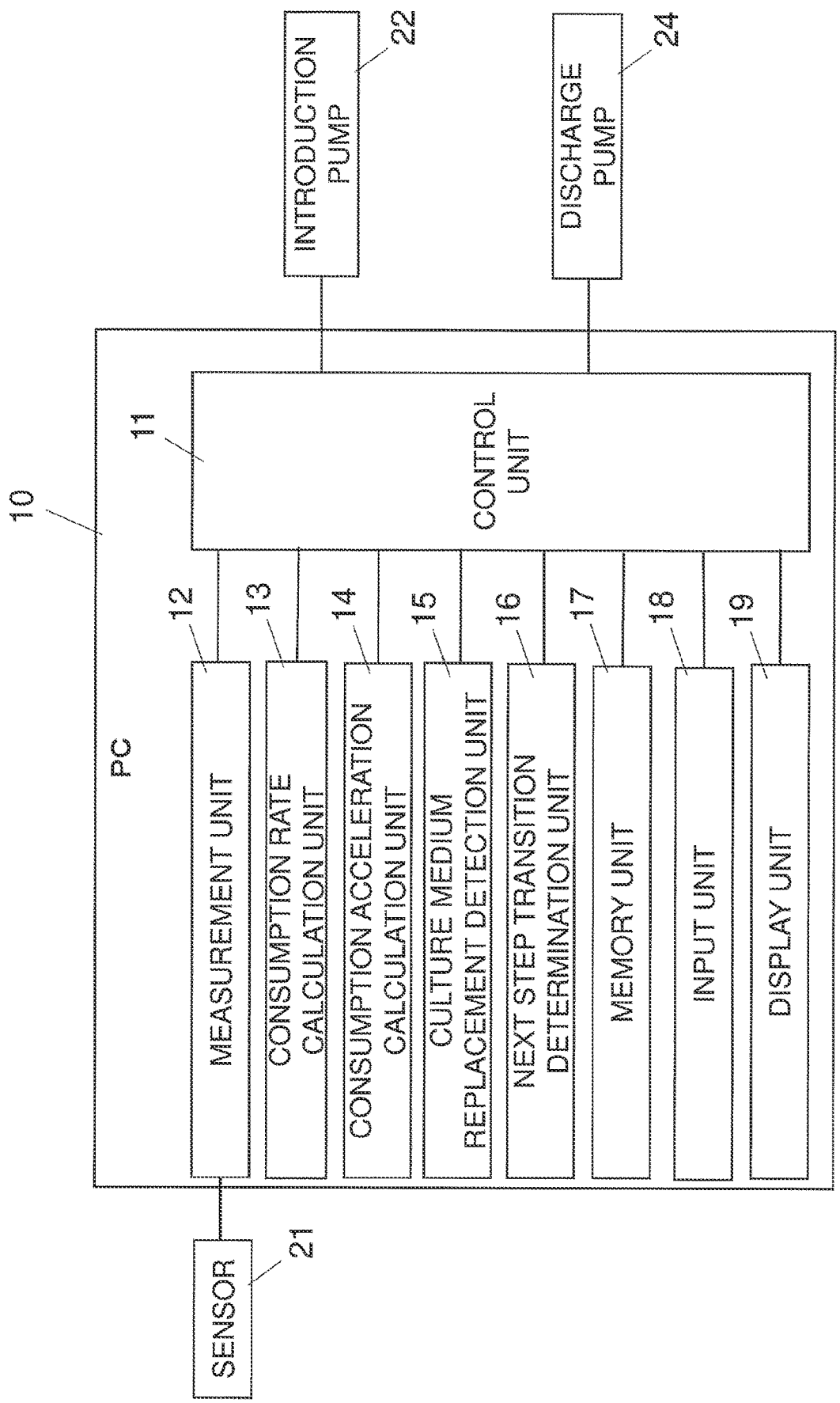
FIG. 2 is a control block diagram of the internal configuration of the PC in FIG. 1.

As shown in FIG. 2, the PC 10 comprises a control unit 11, a measurement unit (consumption amount information acquisition unit, measurement unit) 12, a consumption rate calculation unit 13, a consumption acceleration calculation unit 14, a culture medium replacement detection unit 15, a next step transition determination unit 16, a memory unit 17, an input unit 18, and a display unit 19.

As shown in FIG. 2, the control unit 11 is connected to and controls the measurement unit 12, the consumption rate calculation unit 13, the consumption acceleration calculation unit 14, the culture medium replacement detection unit 15, the next step transition determination unit 16, the memory unit 17, the input unit 18, and the display unit 19. The control unit 11 is also connected to the introduction pump 22 and the discharge pump 24, and controls the introduction pump 22 and the discharge pump 24 when exchanging the culture medium X in the culture vessel 20, for example.

As shown in FIG. 2, the measurement unit (consumption information acquisition unit, measurement unit) 12 is connected to the control unit 11 and the sensor 21. The measurement unit 12 acquires the concentration of glucose in the culture medium X measured by applying voltage to the measurement electrodes of the sensor 21, and transmits the result to the control unit 11.

As shown in FIG. 2, the consumption rate calculation unit 13 is connected to the control unit 11, calculates the amount of glucose consumed by the cells Y from the glucose concentration continuously measured for a specific length of time by the measurement unit 12, and also calculates the glucose consumption rate by differentiating the glucose consumption amount.

As shown in FIG. 2, the consumption acceleration calculation unit 14 is connected to the control unit 11, and further differentiates the glucose consumption rate calculated by the consumption rate calculation unit 13 to calculate the glucose consumption acceleration.

As shown in FIG. 2, the culture medium replacement detection unit 15 is connected to the control unit 11, and detects that the culture medium X in the culture vessel 20 has been replaced and that processing has ended. For example, the culture medium replacement detection unit 15 detects that the introduction pump 22 and the discharge pump 24 that have been driven to replace the culture medium X contained in the culture vessel 20 have stopped, to detect that the replacement of the culture medium X is complete.

As shown in FIG. 2, the next step transition determination unit 16 is connected to the control unit 11, and when the culture medium replacement detection unit 15 detects that the replacement of the culture medium X in the culture vessel 20 is complete, whether or not to proceed to the next step is determined according to whether or not the consumption rate after replacement of the culture medium X calculated by the consumption rate calculation unit 13 satisfies a specific condition.

More specifically, the next step transition determination unit 16 determines to proceed to the next step in the event that, in the next step transition determination step (discussed below), for example, after the culture medium X is replaced, the difference in the consumption rate before and after the replacement of the culture medium X is a specific value (such as 1.0 mM/h) (condition 1).

Here, the fact that the difference in the consumption rate before and after replacing the culture medium X has a divergence of at least a specific value means that the cells may be under duress, such as when the cells are in a starved state before the culture medium is replaced, or the cells are in an excessive metabolic state after the culture medium is replaced or added.

Accordingly, by performing the next step transition determination processing according to whether or not condition 1 is satisfied, it is detected that the cells are in a state of duress, and the user can be prompted to move on to the next step at an appropriate timing.

Also, the next step transition determination unit 16 determines that, in the next step transition determination processing (discussed below), for example, after the culture medium X has been replaced, it is determined to proceed to the next step in the event that the rate of consumption of the culture medium X within a specific length of time (such as two hours) is lower than immediately after the replacement smaller (condition 2).

Here, the fact that the consumption rate of glucose is lower immediately after the replacement of culture medium X means that, for example, even in an environment where there are no metabolites (such as lactic acid) that would negatively affect cell culture due to culture medium replacement, there may be a drop in the specific consumption rate of glucose (a decrease in the metabolism per cell) due to overcrowding of cells (overgrowth) or the like.

Accordingly, by performing the next step transition determination processing according to whether or not condition 2 is satisfied, it is detected that the state of the cells has deteriorated, and the user can be prompted to move on to the next step at an appropriate timing.

Furthermore, the next step transition determination unit 16 determines to proceed to the next step in the even that, in the next step transition determination processing (discussed below), for example, the consumption acceleration calculated by the consumption acceleration calculation unit 14 becomes negative within a specific length of time (such as two hours) after the culture medium X was replaced (condition 3).

Here, the fact that the acceleration of glucose consumption becomes negative immediately after the replacement of the culture medium X means that, just as with condition 2, even under an environment in which there are no metabolites (such as lactic acid) that would negatively affect cell culture due to culture medium replacement, there may be a drop in the specific consumption rate of glucose (a decrease in the metabolism per cell) due to overcrowding of cells (overgrowth) or the like.

Accordingly, by performing the next step transition determination processing according to whether or not condition 3 is satisfied, just as with condition 2, it is possible to detect that the state of the cells has deteriorated, and to prompt the user to move on to the next step at an appropriate timing.

Also, when the resolution of the sensor 21 for measuring glucose installed in the culture vessel 20 is low, for example, the determination whether to proceed to the next step may be made by combining a condition 4, which is that the consumption rate after replacing the culture medium X be equal to or greater than a specific value, with the above conditions 1 to 3.

Consequently, even when a sensor 21 with low resolution is used and tends to be affected by noise, a better determination can be made by combining the condition 4 that the consumption rate be equal to or greater than a specific value.

Also, any of conditions 1 to 3 may be selected to perform the next step transition determination processing, or two or three conditions may be combined to perform the next step transition determination processing. Furthermore, conditions 1 to 3 may each be combined with the above-mentioned condition 4 to perform the next step transition determination processing.

The transition to the next step includes, for example, transition to the next cell culture step following the current cell culture step, transition to various after-treatment steps following the current step, and termination of the cell culture step.

As shown in FIG. 2, the memory unit 17 is connected to the control unit 11 and stores the concentration and consumption of glucose continuously measured by the measurement unit 12, the consumption rate calculated by the consumption rate calculation unit 13, the consumption acceleration calculated by the consumption acceleration calculation unit 14, and other such information.

As shown in FIG. 2, the input unit 18 is connected to the control unit 11, and is used to input various settings, various information, etc., via operation buttons (input buttons) displayed on the display unit 19, for example.

The display unit 19 is, for example, a liquid crystal display panel that is installed in the PC 10, and is connected to the control unit 11 as shown in FIG. 2 and has a display screen 19a for displaying information related to messages prompting replacement of the culture medium X, a transition to the next step, and so on.

Figure 3:
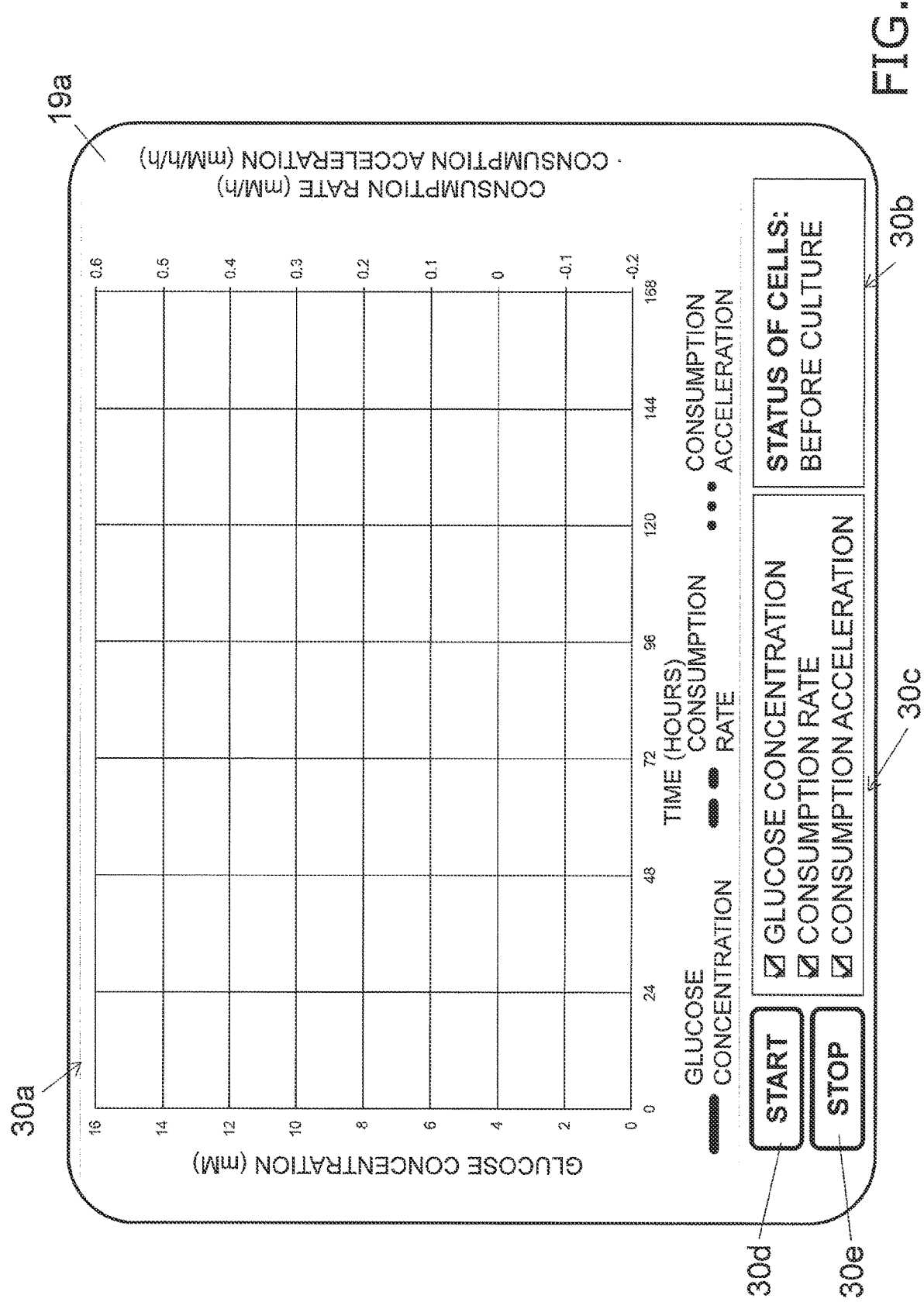
FIG. 3 is a diagram showing an initial screen displayed on the display unit of the PC in FIG. 2.

For example, as shown in FIG. 3, the display screen 19a displays a graph display area 30a, a cell state display area 30b, a graph display selection area 30c, a START button 30d, and a STOP button 30e.

FIG. 3 shows the initial screen that is displayed on the display screen 19a, and shows the state before the cell culture step is performed.

In the graph display area 30a, elapsed time (hours) is displayed on the horizontal axis, glucose concentration (mM) on a first vertical axis (left), and glucose consumption rate (mM/h) and consumption acceleration (mM/h/h) on a second vertical axis (right).

The cell state display area 30b displays the state of the cells Y in the culture vessel 20 at the current elapsed time.

The graph display selection area 30c is used for selecting parameters to be displayed in the graph display area 30a. More specifically, in the graph display selection area 30c, three parameters are displayed as options: glucose concentration, consumption rate, and consumption acceleration. Therefore, the user selects whether or not to display in the graph display area 30a by putting a check in the boxes of any one, two, or all three of these parameters.

The START button 30d is an input button that is displayed in the lower left area of the display screen 19a and is pressed when starting the cell culturing step, and is used to start measurement of the glucose concentration with the sensor 21.

The STOP button 30e is an input button that is displayed in the lower left area of the display screen 19a and is operated when the cell culture step is stopped, and is used to stop the glucose concentration measurement with the sensor 21.

Figure 4:
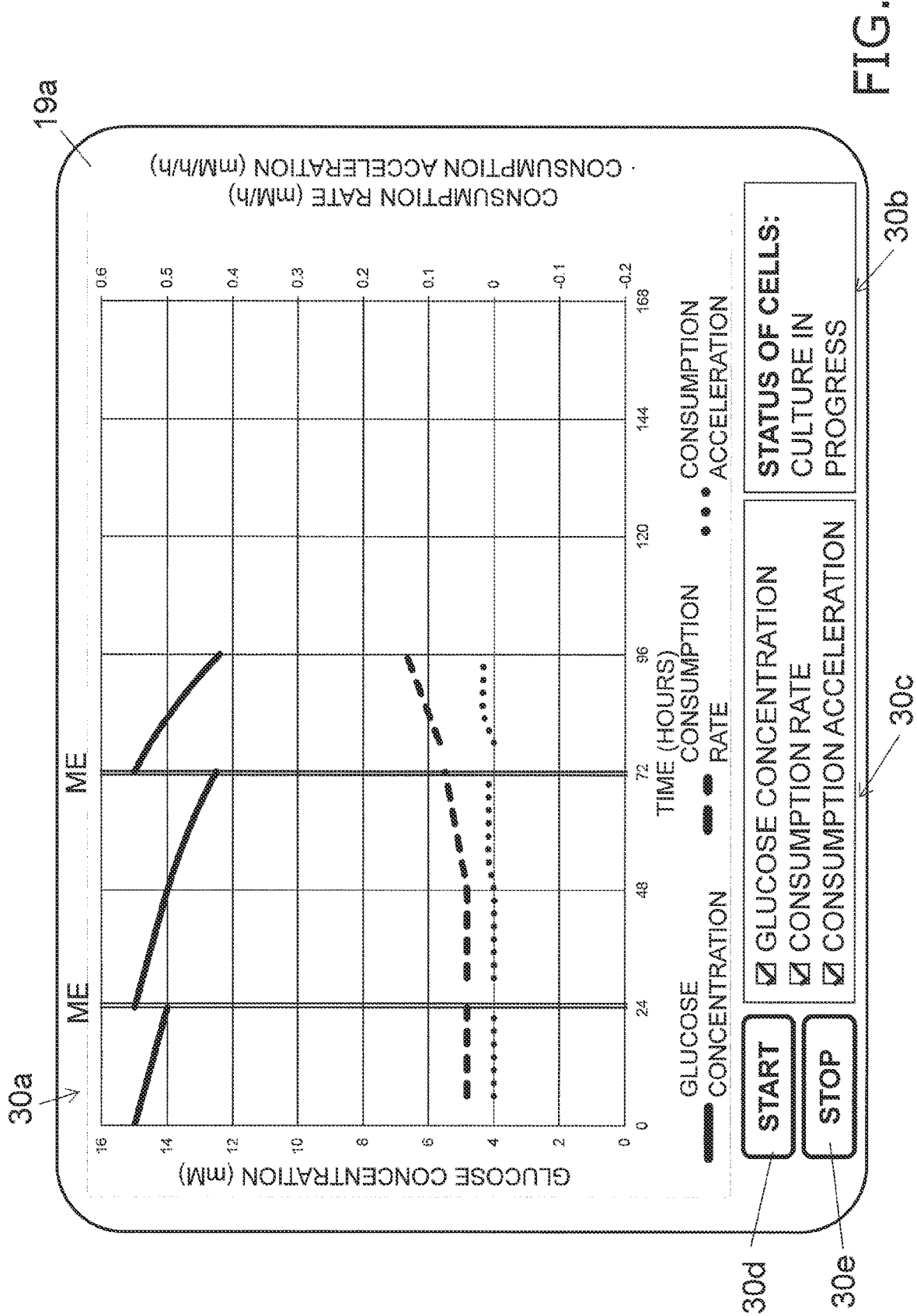
FIG. 4 is a display screen during cell culture that is displayed on the display unit of the PC in FIG. 2, and shows the state 96 hours after the replacement of the culture medium for the second time.

Next, FIG. 4 shows the display screen 19a displayed when 96 hours have elapsed since the cell culture step was started and culture medium replacement (ME) was performed twice.

In the example shown in FIG. 4, a state is shown in which culture medium replacement (ME) is performed 24 hours and 72 hours after the start of cell culture, and the glucose concentration, consumption rate, and consumption acceleration have all been selected in the graph display selection area 30c.

When culture medium replacement (ME) is performed, fresh culture medium X is introduced into the culture vessel 20, so as shown in FIG. 4, the glucose concentration returns to 15 (mM) each time, and as cell culture proceeds from that point on, the glucose concentration gradually decreases.

In a state in which 96 hours have passed since the start of the cell culture step, as shown in FIG. 4, the glucose concentration indicated by the solid line reaches its maximum immediately after culture medium X replacement (ME), and gradually decreases as the culture of the cells Y proceeds.

As shown in FIG. 4, the glucose consumption rate indicated by the dashed line varies between 0 and 0.1 (mM/h) until the second culture medium replacement (ME), and after the second culture medium replacement (ME), gradually increases to over 0.1 (mM/h).

As shown in FIG. 4, the glucose consumption acceleration indicated by the dotted line remains at about 0 (mM/h/h) until the second culture medium replacement (ME), and rises slightly after the second culture medium replacement (ME).

At this point, as shown in FIG. 4, the cell state display area 30b displays "culture in progress" as the cell status.

Fig. shows the display screen 19a displayed when 120 hours have elapsed since the cell culture step was started and culture medium replacement (ME) was performed three times.

Figure 5:
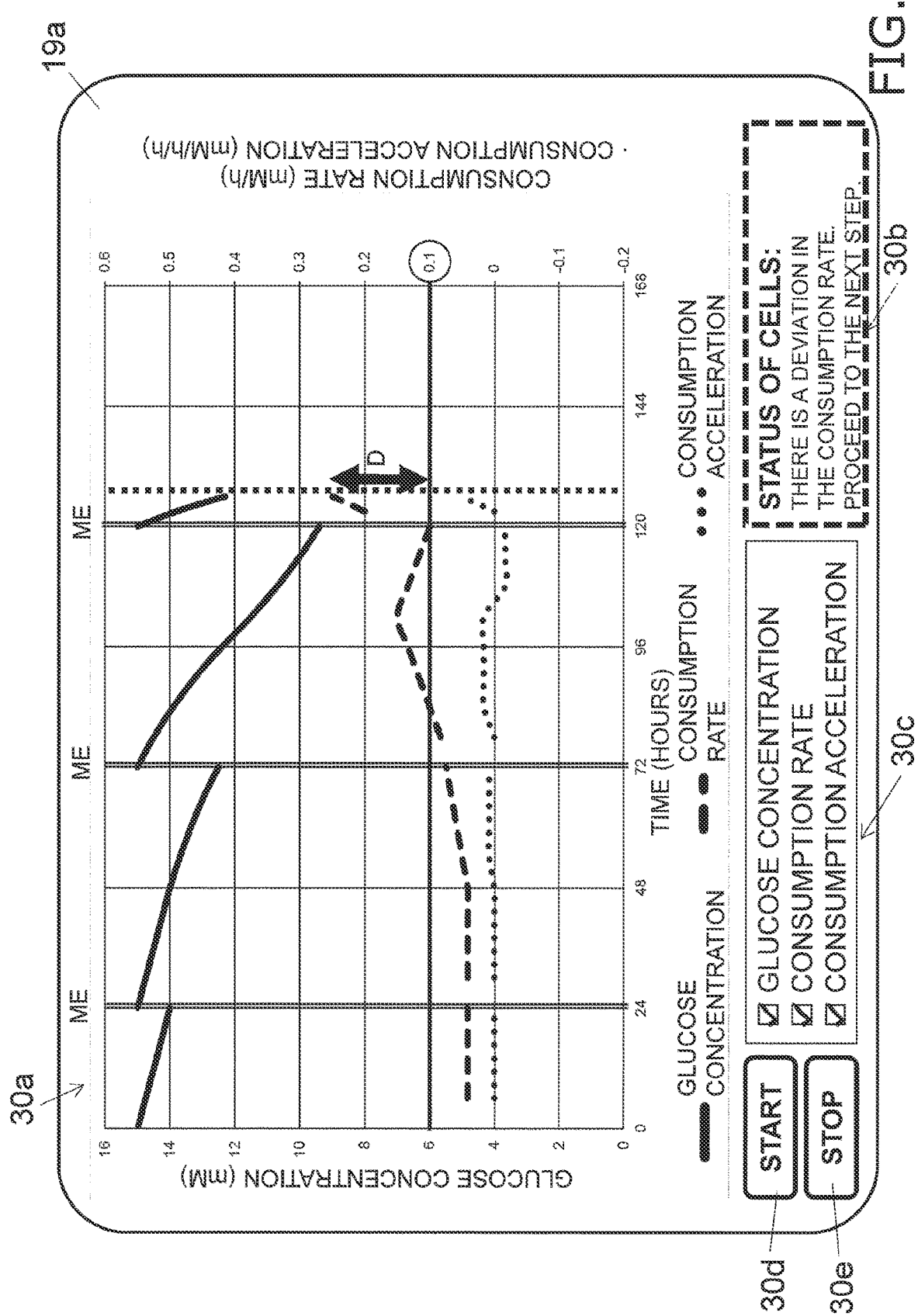
FIG. 5 is a display screen during cell culture that is displayed on the display unit of the PC in FIG. 2, and shows a state in which the next step transition determination is performed after the culture medium has been replaced for the third time.

In the example shown in FIG. 5, culture medium replacement (ME) is performed after 24 hours, 72 hours, and 120 hours from the start of cell culture, and just as in FIG. 4, the graph display selection area 30c shows a state in which glucose concentration, consumption rate, and consumption acceleration have all been selected.

As shown in FIG. 5, in a state in which 120 hours have elapsed since the start of the cell culture step, the glucose concentration indicated by the solid line reaches its maximum immediately after culture medium X replacement (ME) and gradually decreases as the culture of the cells Y proceeds. In particular, the glucose concentration drops off sharply after the third culture medium replacement (ME).

As shown in FIG. 5, the glucose consumption rate indicated by the dashed line varies between 0 and 0.1 (mM/h) up to the second culture medium replacement (ME), and after the second culture medium replacement (ME), gradually rises to over 0.1 (mM/h), peaking at 100 hours, and gradually decreasing by 120 hours. Then, as shown in FIG. 5, after culture medium replacement (ME) is performed at 120 hours, the glucose consumption rate rises sharply by more than 0.1 (mM/h), from the 0.1 (mM/h) immediately before culture medium replacement (ME) to 0.25 (mM/h).

As to the consumption rate, in the next step transition determination processing (discussed below), it is determined whether or not to prompt the user to move on to the next step, according to whether or not a specific condition is satisfied.

That is, in the example shown in FIG. 5, in the next step transition determination processing (discussed below), for example, after culture medium replacement (ME) is performed, it is determined to proceed to the next step if the consumption rate is 0.1 (mM/h) or more and the difference D in the consumption rate before and after culture medium replacement (ME) is equal to or greater than a specific value (such as 0.1 mM/h) (condition 1).

As shown in FIG. 5, the glucose consumption acceleration indicated by the dotted line remains at about 0 (mM/h/h) until the second culture medium replacement (ME), rises slightly after the second culture medium replacement (ME), and turns negative after 100 hours. After this, as shown in FIG. 5, the acceleration of glucose again turns positive and rises sharply after culture medium replacement (ME) is performed after 120 hours.

At this point, as shown in FIG. 5, the state of the cells is displayed in the cell state display area 30b by showing the message "There is a deviation in the consumption rate. Proceed to the next step" as the result of determination by the next step transition determination processing (discussed below).

Figure 6:
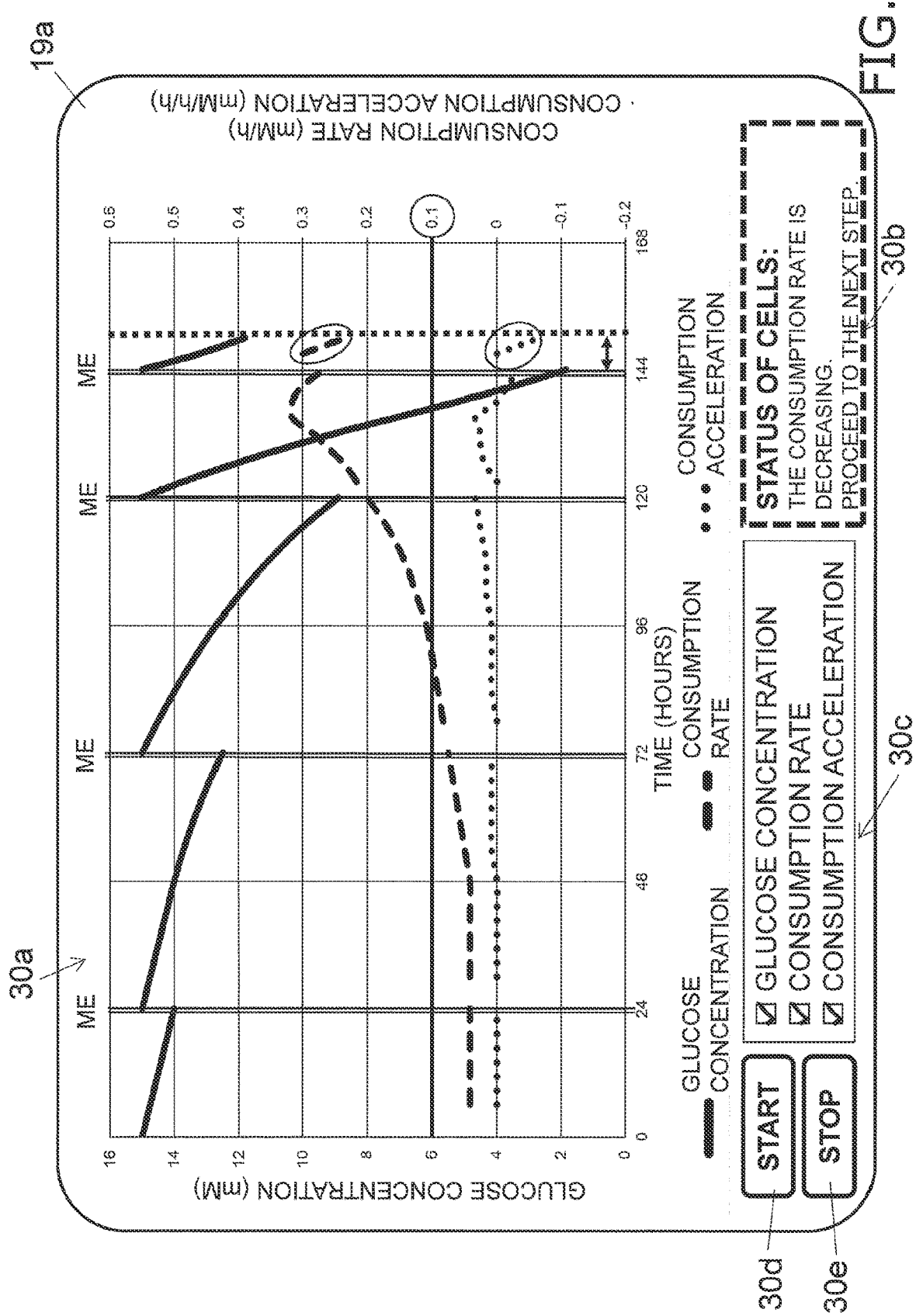
FIG. 6 is a display screen during cell culture that is displayed on the display unit of the PC in FIG. 2, and shows a state in which the next step transition determination is performed after the culture medium has been replaced for the fourth time.

FIG. 6 shows the display screen 19a that is displayed when 144 hours have elapsed since the cell culture step was started and culture medium replacement (ME) was performed four times.

In the example shown in FIG. 6, culture medium replacement (ME) is performed after 24 hours, 72 hours, 120 hours, and 144 hours from the start of cell culture, and just as in FIGS. 4 and 5, the graph display selection area 30c shows a state in which glucose concentration, consumption rate, and consumption acceleration have all been selected.

Also, the graph shown in FIG. 6 does not show the result after 24 hours as in the graph shown in FIG. 5, and instead shows another example.

In a state in which 144 hours have elapsed since the start of the cell culture step, as shown in FIG. 6, the glucose concentration indicated by the solid line reaches its maximum immediately after culture medium X replacement (ME), and gradually decreases as the culture of the cells Y proceeds. In particular, the glucose concentration drops off sharply after the third culture medium replacement (ME), and also drops off sharply after the fourth culture medium replacement (ME).

As shown in FIG. 6, the glucose consumption rate indicated by the dashed line varies between 0 and 0.1 (mM/h) until the second culture medium replacement (ME), and the after the second culture medium replacement (ME), gradually increases to over 0.1 (mM/h), peaking at 130 hours and gradually decreasing by 144 hours. Then, as shown in FIG. 6, the glucose consumption rate rises sharply from 0.3 (mM/h) to about 0.2 (mM/h) after culture medium replacement (ME) at 144 hours.

As to the consumption rate, in the next step transition determination processing (discussed below), it is determined whether or not to prompt the user to move on to the next step, according to whether or not a specific condition is satisfied.

In the example shown in FIG. 6, in the next step transition determination processing (discussed below), for example, after culture medium replacement (ME) is performed, it is determined to proceed to the next step if the consumption rate is 0.1 (mM/h) or more and the consumption rate decreases within a specific length of time (such as two hours), rather than immediately after the culture medium X is replaced (condition 2).

As shown in FIG. 6, the glucose consumption acceleration indicated by the dotted line remains at about 0 (mM/h/h) until the second culture medium replacement (ME), and rises slightly after the second culture medium replacement (ME), then decreases again to about 0 after 120 hours, and the negative value increases after culture medium replacement (ME) is performed at 144 hours.

As to the consumption rate, in the next step transition determination processing (discussed below), it is determined whether or not to prompt the user to move on to the next step, according to whether or not a specific condition is satisfied.

In the example shown in FIG. 6, in the next step transition determination processing (discussed below), for example, it is determined to proceed to the next step if, after culture medium replacement (ME) is performed, the consumption rate is 0.1 (mM/h) or more and the consumption acceleration calculated by the consumption acceleration calculation unit 14 becomes negative within a specific length of time (such as two hours) (condition 3).

At this point, as shown in FIG. 6, the state of the cells is displayed in the cell state display area 30b by showing the message "The consumption rate is decreasing. Proceed to the next step" as the result of determination by the next step transition determination processing (discussed below).

Consequently, the message displayed in the cell state display area 30b of the display screen 19a of the display unit 19 prompts the user to proceed to the next step. This allows the user to take action to proceed to the next step by removing the culture vessel 20 from the cell culture device 50, for example.

Next Step Transition Determination Processing

With the cell culture device 50 of this embodiment, because of the configuration described above, the control unit 11 of the PC 10 determines whether or not to proceed from the current step to the next step according to whether or not the consumption rate of glucose contained in the culture medium X in the culture vessel 20 satisfies a specific condition.

Figure 7:
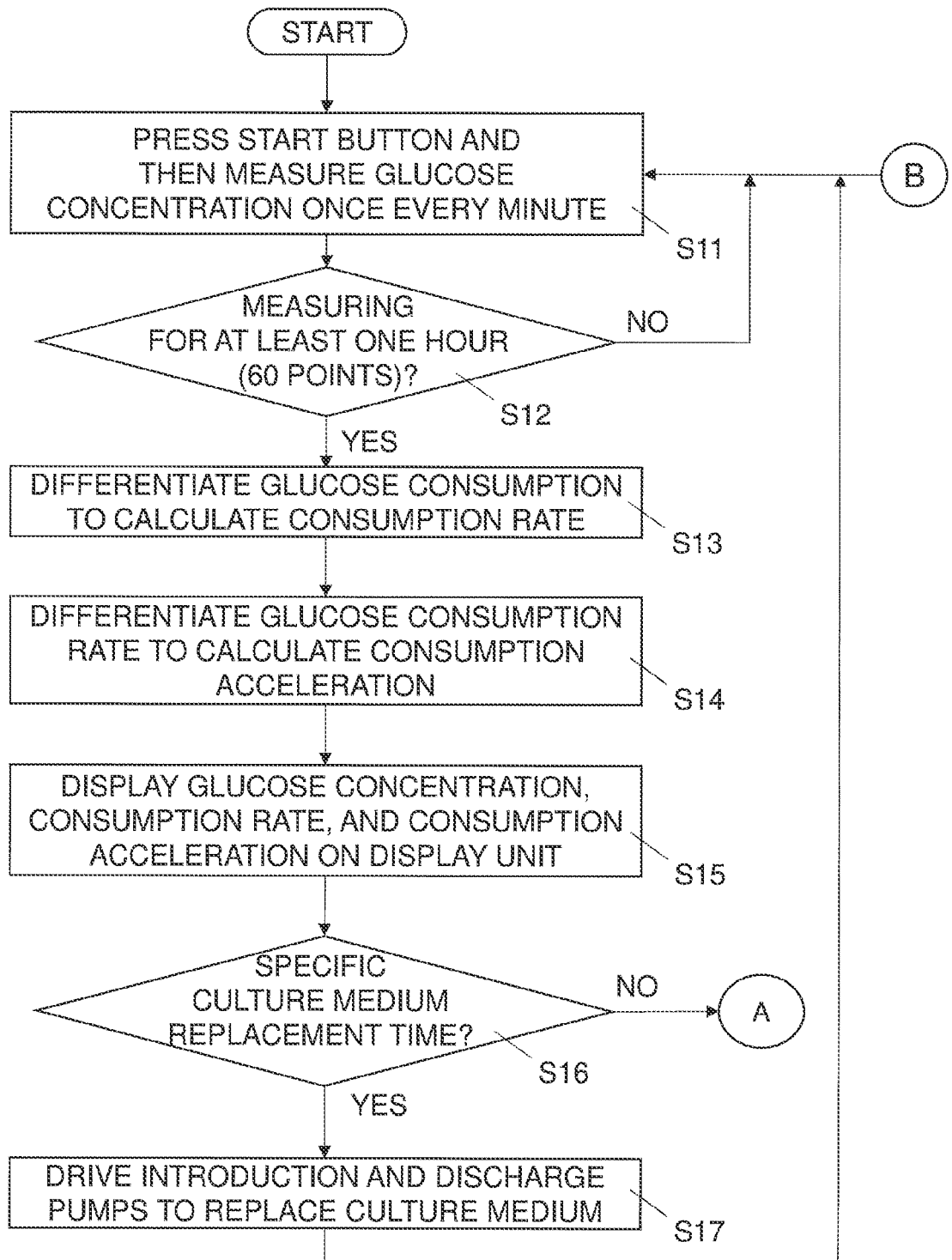
FIG. 7 is a flow chart showing the flow of processing up to culture medium replacement in the cell culture control method executed by the PC in FIG. 2.
Figure 8:
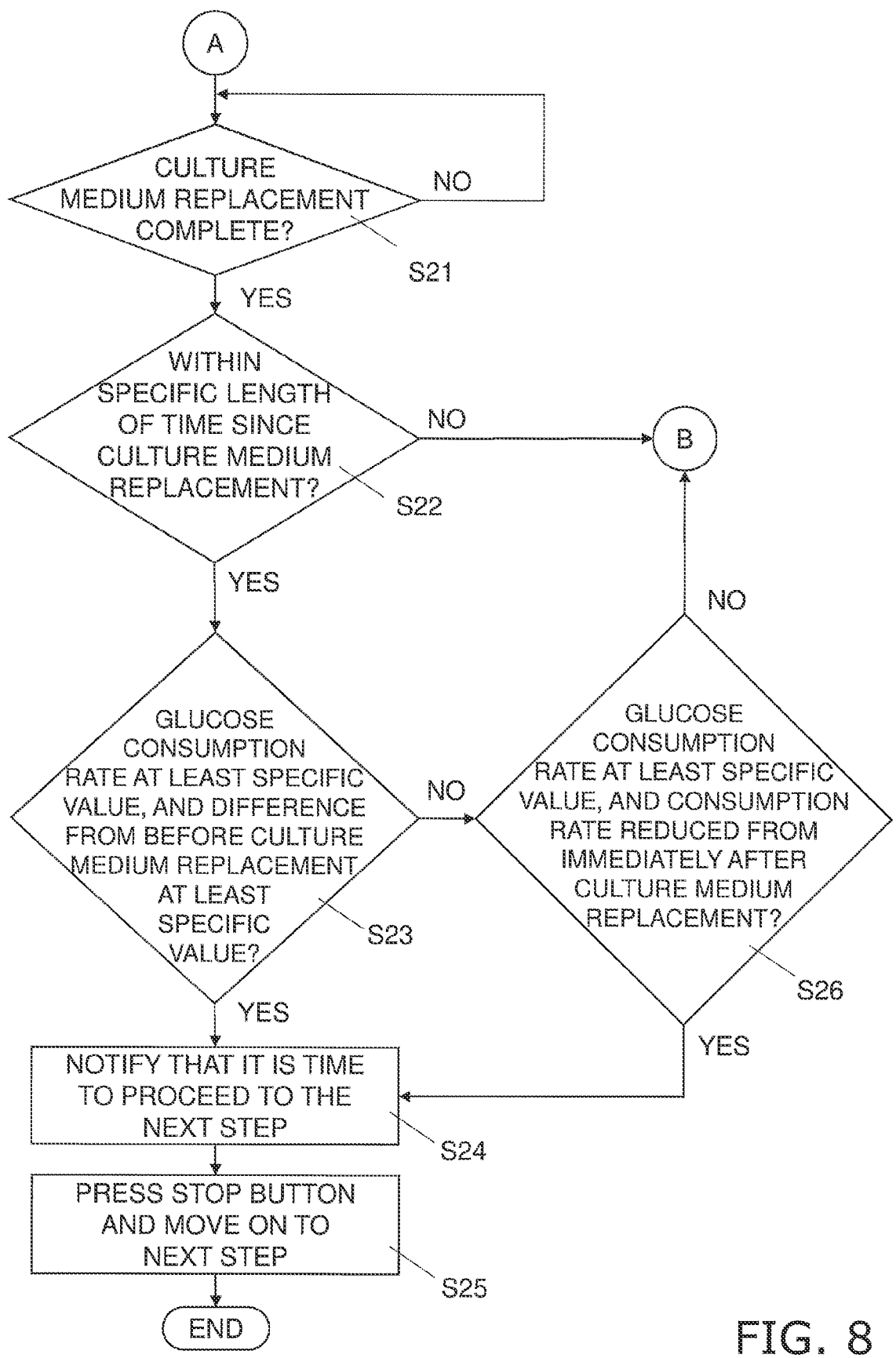
FIG. 8 is a flow chart showing the flow of processing in the next step transition determination after culture medium replacement in the cell culture control method following FIG. 7.

More specifically, the PC 10 of the cell culture device 50 performs the next step transition determination processing according to the flowcharts shown in FIGS. 7 and 8.

That is, as shown in FIG. 7, in step S11, when the START button 30d displayed on the display screen 19a of the display unit 19 is pressed to start cell culture, the measurement unit 12 uses the sensor 21 to continuously measure the glucose concentration in the culture vessel 20 at one-minute intervals.

Next, in step S12, the measurement unit 12 determines whether or not the glucose concentration has been measured continuously for a specific length of time (such as one hour) or longer, and repeats step S11 until the measurement has lasted at least one hour.

Next, in step S13, since it was determined in step S12 that the measurement has been performed for at least a specific period of length of time (one hour (60 points)), the control unit 11 calculates the moving average of the most recent glucose consumption (such as 60 points), and add this to the time series of the average amount of glucose consumption.

Next, in step S14, the consumption rate calculation unit 13 differentiates the glucose consumption to calculate the gradient of a graph showing the average value of consumption, that is, the glucose consumption rate.

Next, in step S15, the consumption acceleration calculation unit 14 differentiates the glucose consumption rate to calculate the gradient of a graph of the consumption rate, that is, the glucose consumption acceleration.

Next, in step S16, the culture medium replacement detection unit 15 determines whether or not a preset culture medium replacement (ME) time has been reached (such as 24 hours, 72 hours, and 120 hours in the example shown in FIG. 5). Here, if it is determined that a specific culture medium replacement time has been reached, the flow proceeds to step S17, and if it is determined that a specific culture medium replacement time has not been reached, the flow proceeds to the flowchart of FIG. 8.

Next, in step S17, since it was determined in step S16 that a specific culture medium replacement time was reached, the culture medium X in the culture vessel 20 is replaced, and the flow returns to step S11.

The culture medium X in the culture vessel 20 is replaced automatically when the control unit 11 drives the introduction pump 22 and the discharge pump 24 installed in the culture vessel 20.

The replacement of the culture medium X in the culture vessel 20 may be performed manually by the user with a pipette, for example, when a message prompting replacement of the culture medium is displayed on the display screen 19a of the display unit 19, for instance.

Next, as shown in FIG. 8, in step S21, since the culture medium replacement detection unit 15 determined in step S16 of FIG. 7 that a specific culture medium replacement time had not been reached, it is determined whether or not the immediately preceding culture medium replacement has been completed.

Here, the determination is repeated until the culture medium replacement in the culture vessel 20 is complete, and once the culture medium replacement detection unit 15 determines that the replacement of the culture medium has been completed, the flow proceeds to step S22.

The completion of culture medium replacement in the culture vessel 20 is detected by the culture medium replacement detection unit 15 when, for example, the control unit 11 stops the introduction pump 22 and the discharge pump 24 that were driven during the culture medium replacement. Alternatively, the culture medium replacement detection unit 15 may detect the completion of culture medium replacement by detecting that the START button 30d displayed on the display screen 19a has been pressed and the cell culture that had been paused during culture medium replacement has been restarted.

Next, in step S22, since it was determined in step S21 that the culture medium replacement was complete, it is determined whether or not a specific length of time (such as two hours) has elapsed after the culture medium replacement. Here, if the specific length of time has elapsed, the flow proceeds to step S23, and if the specific length of time has not elapsed, the flow returns to step S11 in FIG. 7.

Next, in step S23, since it was determined in step S22 that a specific length of time (such as two hours) has elapsed since the culture medium replacement was completed, the next step transition determination unit 16 determines whether or not the glucose consumption rate satisfies a specific condition within a specific length of time (two hours).

More specifically, in step S23, the next step transition determination unit 16 determines whether or not the glucose consumption rate is at least a specific value (such as 0.1 mM/h) (condition 4) and the difference D from before culture medium replacement (see FIG. 5) is at least a specific value (such as 0.1 mM/h) (condition 1).

Here, if conditions 1 and 4 are both satisfied, the next step transition determination unit 16 proceeds to step S24, and if either of conditions 1 and 4 is not satisfied, the flow proceeds to step S26.

Next, in step S24, since it was determined in step S23 that conditions 1 and 4 were satisfied, the control unit 11 controls the display unit 19 to display on the display screen 19a a message prompting the user to proceed to the next step, or the like.

Next, in step S25, upon reading the message displayed on the display screen 19a, the user presses the STOP button 30e displayed on the display screen 19a, and processing to transition to the next step is performed.

Consequently, upon reading the message displayed on the display screen 19a, the user can take measures to proceed to the next step. Therefore, the quality of the cells can be maintained by moving on to the next step on the basis of the result of appropriately determining the time at which to proceed to the next step according to the state of the cells.

On the other hand, in step S26, since it was determined in step S23 that either of conditions 1 and 4 was not satisfied, the next step transition determination unit 16 determines whether the other conditions 2 and 4 are satisfied.

More specifically, in step S26, the next step transition determination unit 16 determines whether or not the glucose consumption rate is at least a specific value (such as 0.1 mM/h) (condition 4) and the consumption rate is decreasing compared with immediately after culture medium replacement (condition 2) (see FIG. 6).

Instead of this condition 2, the step transition determination processing may be performed when the glucose consumption acceleration indicated by the dotted line in FIG. 6 becomes negative within a specific length of time (such as two hours) (condition 3).

Here, if conditions 2 and 4 are both satisfied, the next step transition determination unit 16 proceeds to step S24, and if either of conditions 2 and 4 is not satisfied, the flow returns to step S11.

Embodiment 2

A PC (personal computer; cell culture control device 210) and a cell culture device 250 equipped with the same according to another embodiment of the present invention will now be described with reference to FIGS. 10 and 11.

Figure 10:
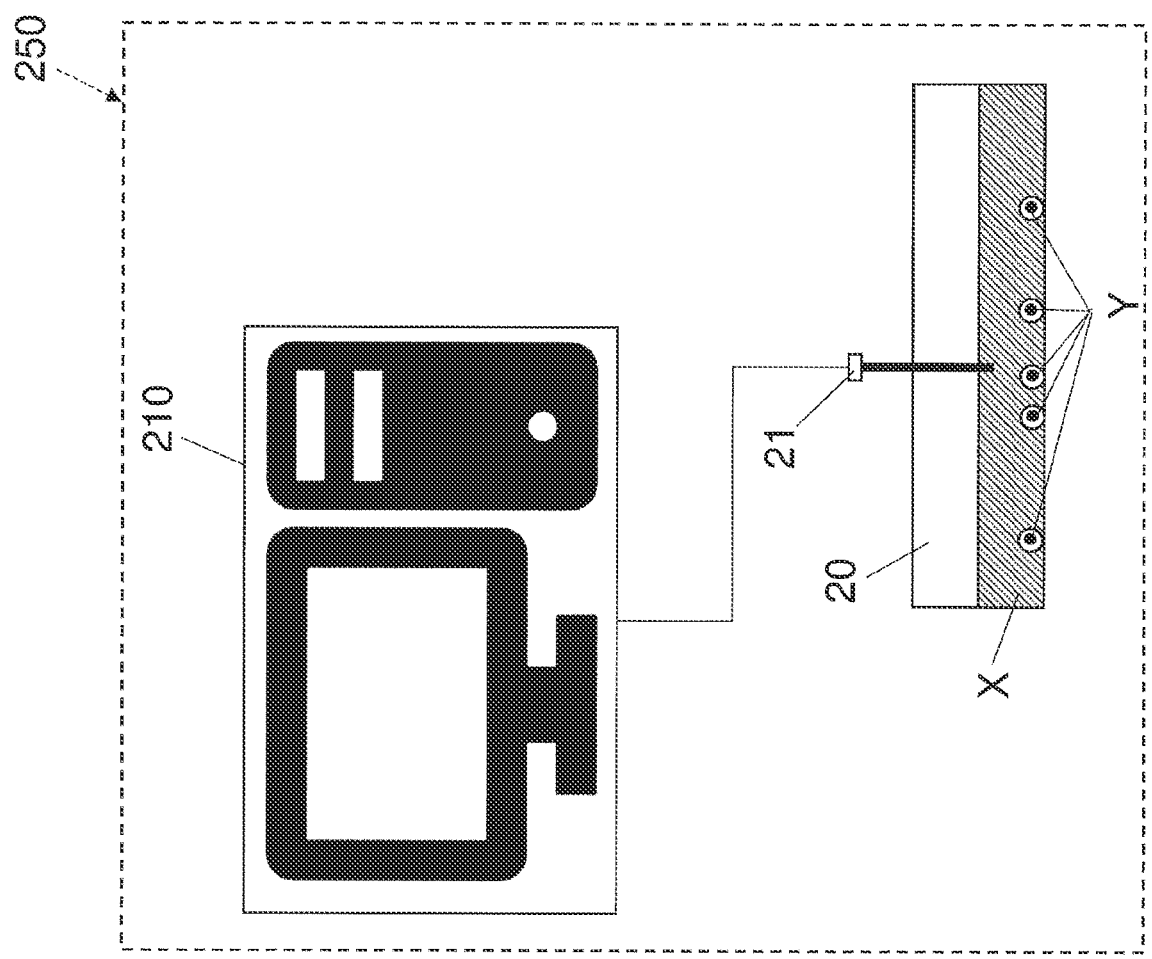
FIG. 10 is a schematic diagram of the configuration of a cell culture device including a PC according to yet another embodiment of the present invention.

That is, as shown in FIG. 10, the cell culture device 250 in this embodiment is different in that the introduction pump 22 and the discharge pump 24 that were installed in the culture vessel 20 in Embodiment 1 are not provided.

The rest of the configuration is substantially the same, so for convenience of explanation, those components with the same function will be numbered the same and will not be described in detail again.

As shown in FIG. 10, the cell culture device 250 is installed in a state in which the distal end of the sensor 21 is immersed in the culture medium X contained in the culture vessel 20.

Figure 11:
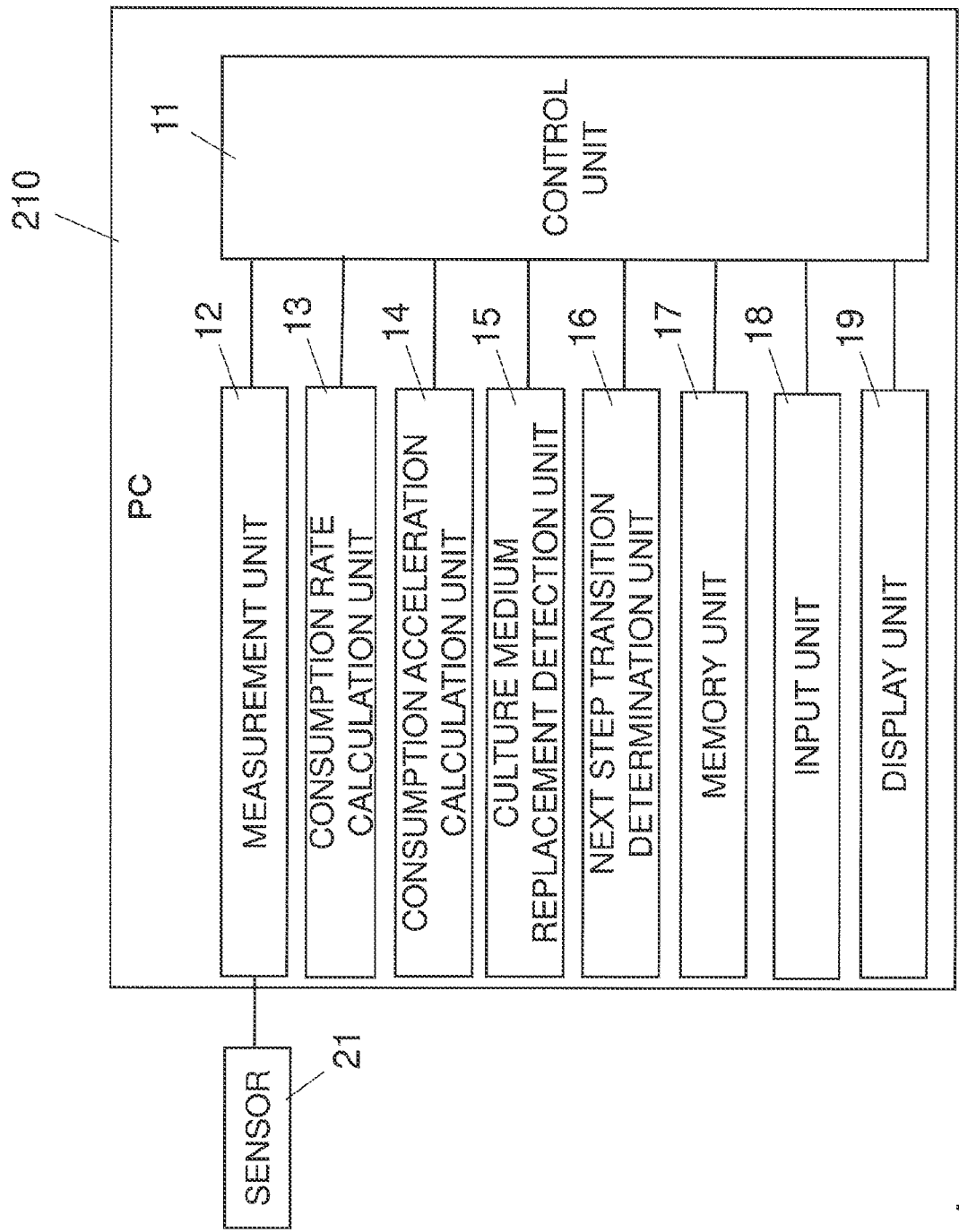
FIG. 11 is a control block diagram showing the internal configuration of the PC in FIG. 10.

As shown in FIG. 11, the control unit 11 of the PC 210 continuously measures the concentration of glucose contained in the culture medium X by using the measurement unit 12 connected to the sensor 21, just as in the first embodiment.

The control unit 11 controls the display unit 19 so as to display a message or the like to the user suggesting manual replacement of the culture medium X once a preset culture medium replacement time arrives.

Consequently, in the PC 210, when the culture medium replacement detection unit 15 detects that the replacement of the culture medium X in the culture vessel 20 is complete, and the next step transition determination unit 16 determines that the above-mentioned conditions 1 to 4 are satisfied, the control unit 11 causes the display screen 19*a* of the display unit 19 to display a message or the like prompting the user to proceed to the next step.

As a result, even when the culture medium X in the culture vessel 20 is replaced manually without the use of a pump, when an input is received indicating that the culture medium replacement has ended, or when an input is received for restarting the cell culture that has been paused upon completion of the culture medium replacement, the control unit 11 causes the display screen 19*a* of the display unit 19 to display a message or the like prompting the user to move on to the next step, which allows the user to move on to the next step at the appropriate time according to the state of the cells and to maintain the quality of the cells.

Embodiment 3

A PC (personal computer; cell culture control device) 310 and a cell culture device 350 equipped with the same according to another embodiment of the present invention will now be described with reference to FIGS. 14 to 16.

Figure 14:
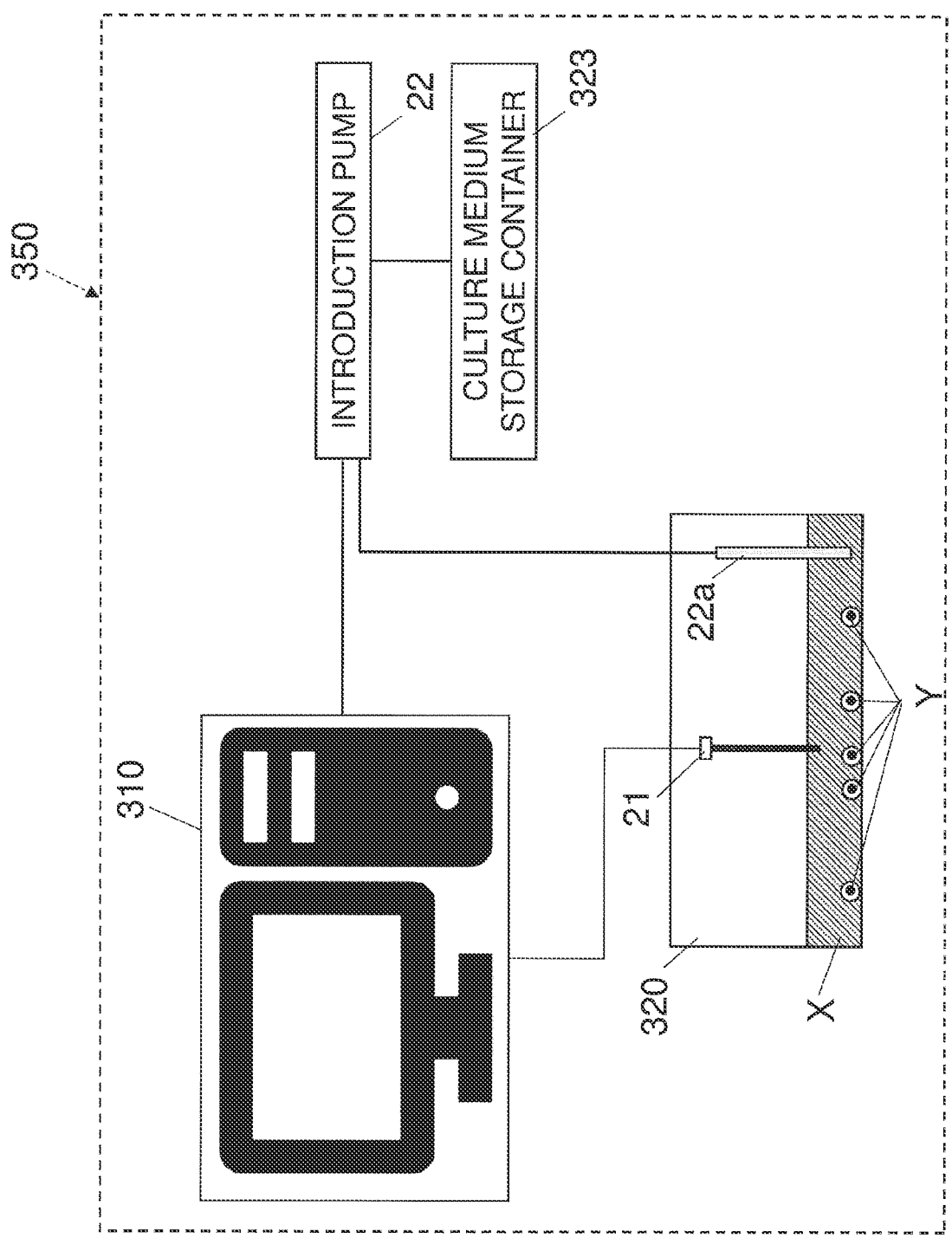
FIG. 14 is a schematic diagram of the configuration of a cell culture device including a PC according to yet another embodiment of the present invention.
Figure 15:
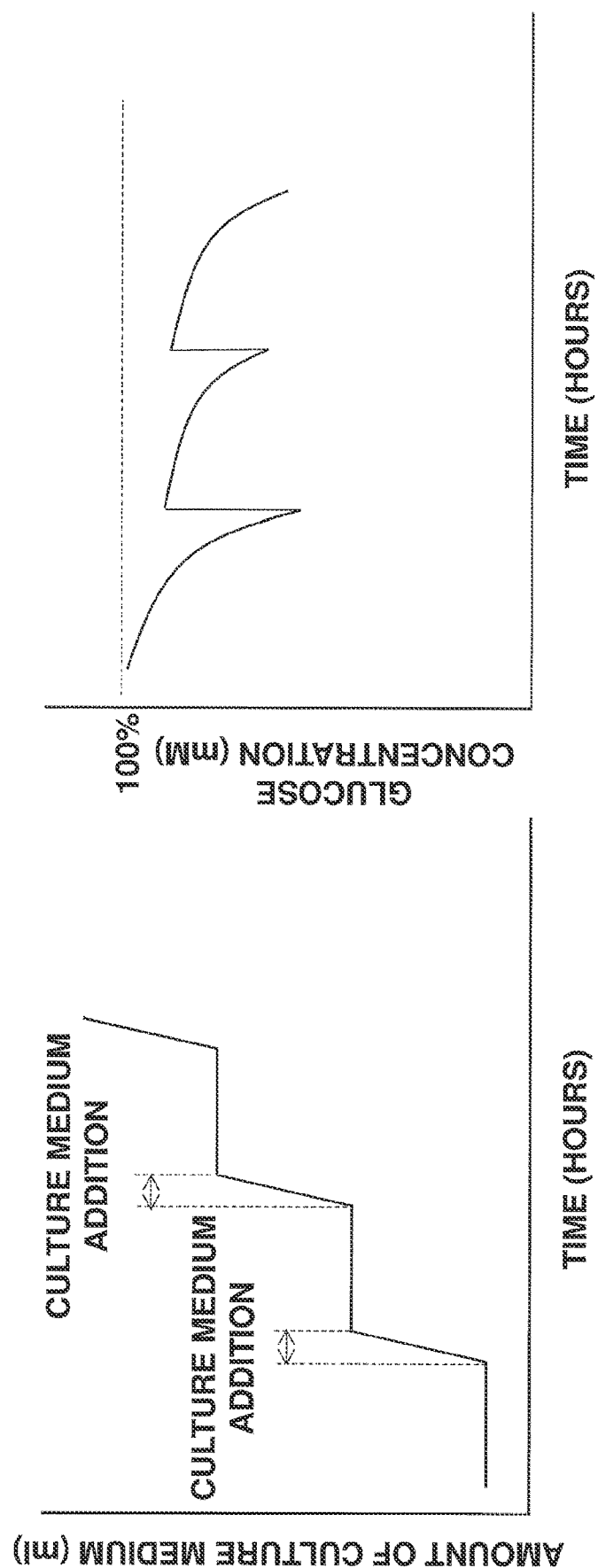
FIG. 15A is a graph of the relation between time and the amount of culture medium in the culture vessel in culture medium addition control by the cell culture device of FIG. 14.
FIG. 15B is a graph of the relation between glucose concentration and time, which changes corresponding to FIG. 15A.

The cell culture device 350 in differs from the configuration of Embodiment 1 in that, as shown in FIG. 14, no discharge pump, discharge port, or waste liquid container is provided in order to add fresh culture medium X to the culture vessel 320.

The rest of the configuration is substantially the same, so for convenience of explanation, those components with the same function will be numbered the same and will not be described in detail again.

More specifically, with the cell culture device 350 of this embodiment, the PC 310 performs control to add fresh culture medium X to the culture vessel 320, instead of replacing (swapping out) the culture medium X in the culture vessel 320 with fresh culture medium X, every time a specific length of time elapses.

For example, when fresh culture medium X having the same concentration as that of the culture medium X initially put into the culture vessel 320 is added to the culture vessel 320 every time a specific length of time elapses, the amount of culture medium X in the culture vessel 320 increases in steps as shown in FIG. 15A.

At this point, the glucose concentration immediately after adding fresh culture medium X is not restored to the initial concentration each time the culture medium X is replaced as in Embodiment 1, and instead gradually decreases, without ever being restored to 100%, as shown in FIG. 15B.

Figure 16:
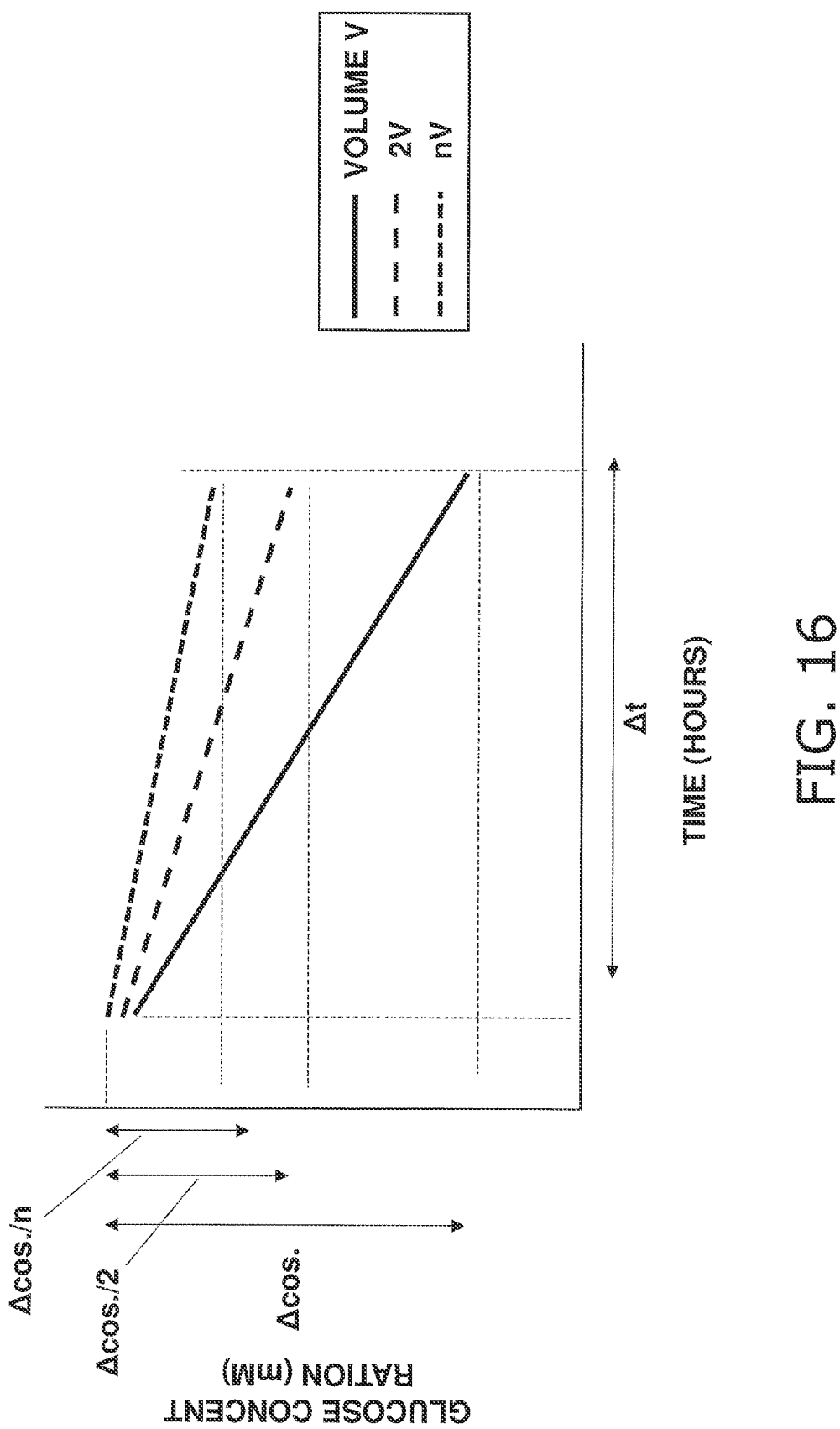
FIG. 16 is a graph of the effect that the amount of culture medium put in a culture vessel affects the amount of change in glucose concentration in a specific length of time.

Here, if the number of cells in the culture vessel 320 and the consumption rate per unit number of cells are the same, the glucose consumption rate depends on the volume of the culture medium X (V, 2v, nV), as shown in FIG. 16, and the amount of change in the glucose concentration at each specific time Δt (sampling rate) varies.

In other words, when the culture medium X in the culture vessel 310 is replenished, rather than being replaced, the glucose concentration change depends not only on the glucose concentration but also on the volume of the culture medium X.

In this embodiment, fresh culture medium X having the same concentration as the culture medium X initially put into the culture vessel 320 is added to the culture vessel 320 every time a specific period of length of time elapses. Therefore, the PC 310 (consumption amount information acquisition unit) calculates the glucose consumption on the basis of the glucose concentration contained in the culture medium X and the volume of the culture medium X.

Figure 17:
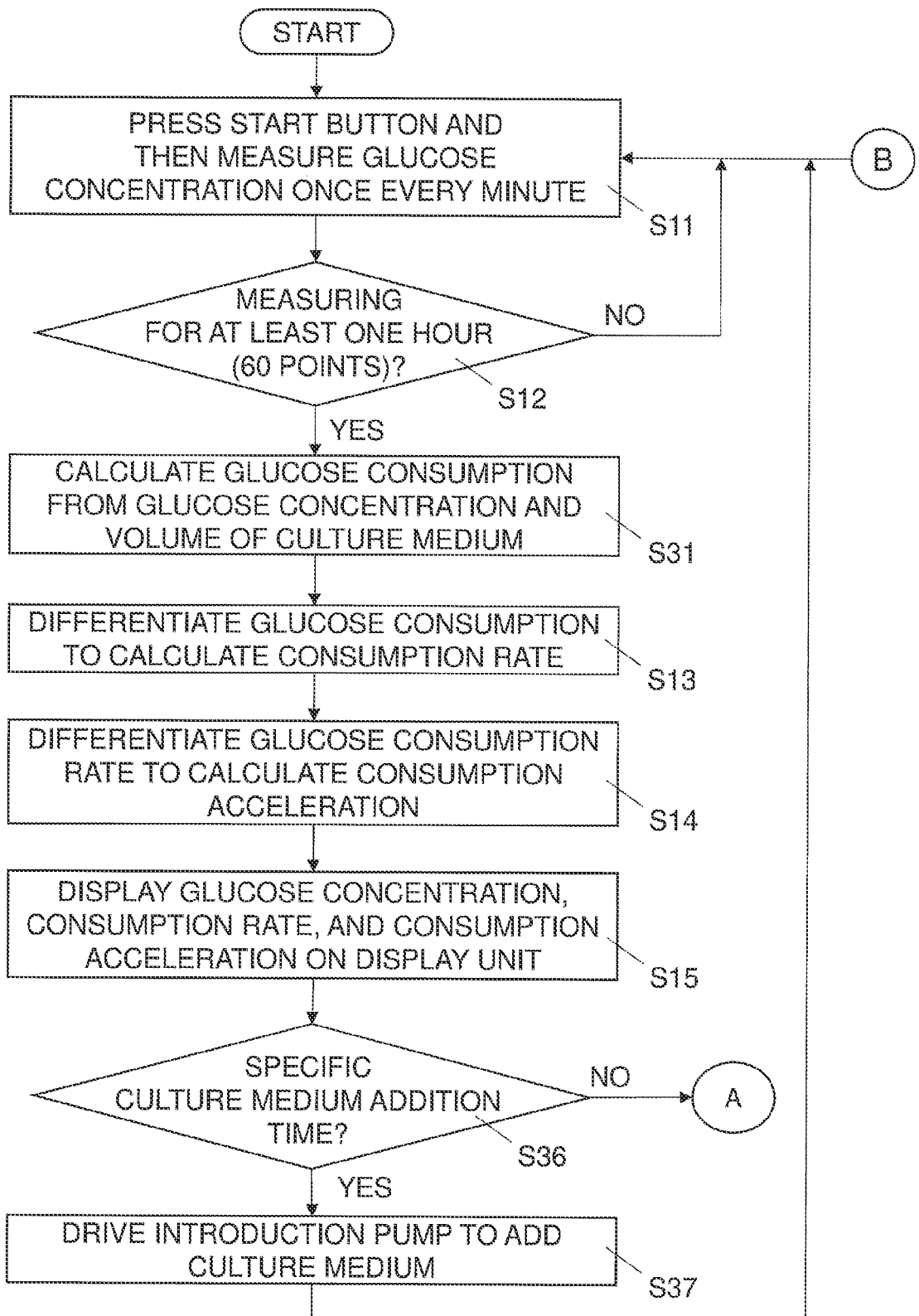
FIG. 17 is a flowchart showing the flow of processing in the next step transition determination after culture medium replacement in the cell culture control method according to yet another embodiment of the present invention.

Consequently, in the flowchart of FIG. 7 described in Embodiment 1 above, the glucose consumption is calculated from the glucose concentration and the volume of culture medium X in step S31 after step S12, as shown in FIG. 17.

The volume of culture medium X is calculated, for example, as the sum of the volume of culture medium X initially put into culture vessel 320 and the drive amount of the introduction pump 22 or a preset introduction amount.

Next, in step S13, the glucose consumption is differentiated to calculate the consumption rate.

Next, in step S14, the consumption rate calculation unit 13 differentiates the glucose consumption to calculate the gradient of a graph showing the average value of the consumption, that is, the glucose consumption rate.

Next, in step S15, the consumption acceleration calculation unit 14 differentiates the glucose consumption rate to calculate the gradient of a graph showing the consumption rate, that is, the glucose consumption acceleration.

Next, in step S36, the culture medium replacement detection unit 15 determines whether or not a specific culture medium addition has been performed. Here, if it is determined that a specific culture medium addition time has been reached, the flow proceeds to step S37, and if it is determined that the specific culture medium addition time has not been reached, the flow proceeds to the flowchart of FIG. 8.

Next, in step S37, since it was determined in step S36 that the specific culture medium addition time had not been reached, the culture medium X is added to the culture vessel 20, and the flow returns to step S11.

Consequently, just as in the above embodiment, the cell quality can be maintained by moving on to the next step at the appropriate time according to the state of the cells.

Other Embodiments

An embodiment of the present invention was described above, but the present invention is not limited to or by the above embodiment, and various modifications are possible without departing from the gist of the invention.

(A)

In the above embodiment, an example was given in which the present invention was realized as a cell culture control device and method. However, the present invention is not limited to this.

For example, the present invention may be realized as a cell culture control program that causes a computer to execute the method of the cell culture control device described above.

This program is stored in the memory (memory unit 17) installed in the cell culture control device, and the CPU reads the cell culture control program stored in the memory and causes the hardware to execute the steps. More specifically, the same effect as above can be obtained by having the CPU read the cell culture control program and execute the above-mentioned consumption amount information acquisition step, consumption rate calculation step, culture medium replacement detection step, and next step transition determination step.

Also, the present invention may be realized as a recording medium that stores a cell culture control program.

(B)

In the above embodiment, an example was given in which the PC 10, which was equipped with the display unit 19 for displaying a message or the like prompting the user to move on to the next step, was used as the cell culture control device. However, the present invention is not limited to this.

Figure 9:
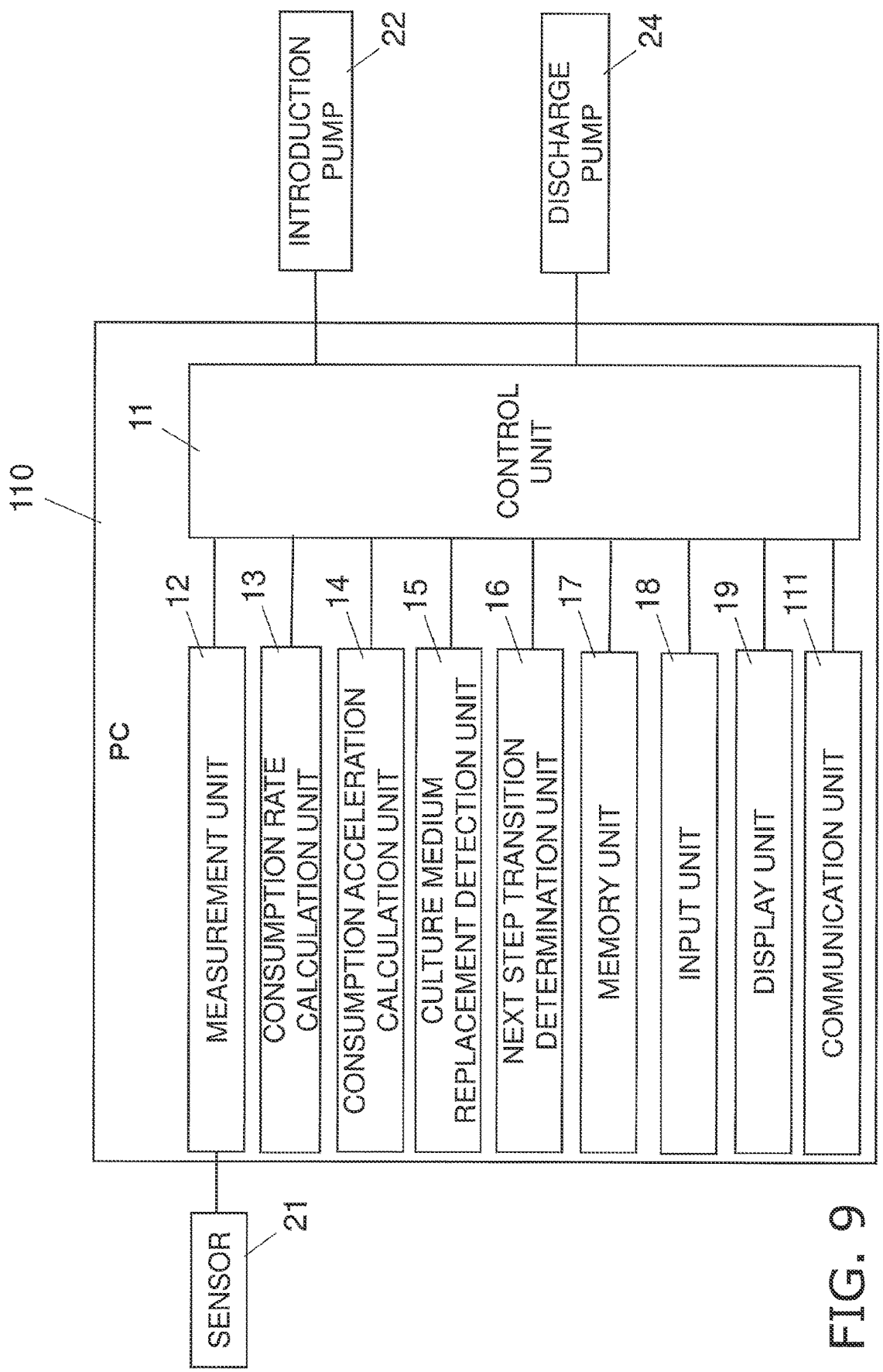
FIG. 9 is a control block diagram showing the internal configuration of the PC according to another embodiment of the invention.

For example, instead of displaying a message on the display unit, a PC (cell culture control device) 110 may be used that comprises a communication unit 111 (see FIG. 9) that sends email including a message or the like prompting the user to proceed to the next step to a portable telephone, smartphone, tablet terminal, PC, or the like owned by the user.

Also, for example, instead of displaying a message on the display unit, the user may be notified by sound, light, vibration, or the like that it is time to proceed to the next step.

(C)

In the above embodiment, as shown in FIG. 2, an example was given in which the PC 10 comprised the consumption acceleration calculation unit 14 that calculated the consumption acceleration by further differentiating the glucose consumption rate. However, the present invention is not limited to this.

For example, if condition 1 or 2 out of conditions 1 to 4 described above is used to perform the next step transition determination processing, the consumption acceleration will not be used as a determination condition, so the configuration does not include the consumption acceleration calculation unit.

(D)

In the above embodiment, as shown in FIG. 8, an example was given in which it was determined whether or not conditions 1 and 4 (step S23) and conditions 2 and 4 (step S26) were satisfied. However, the present invention is not limited to this.

Figure 12:
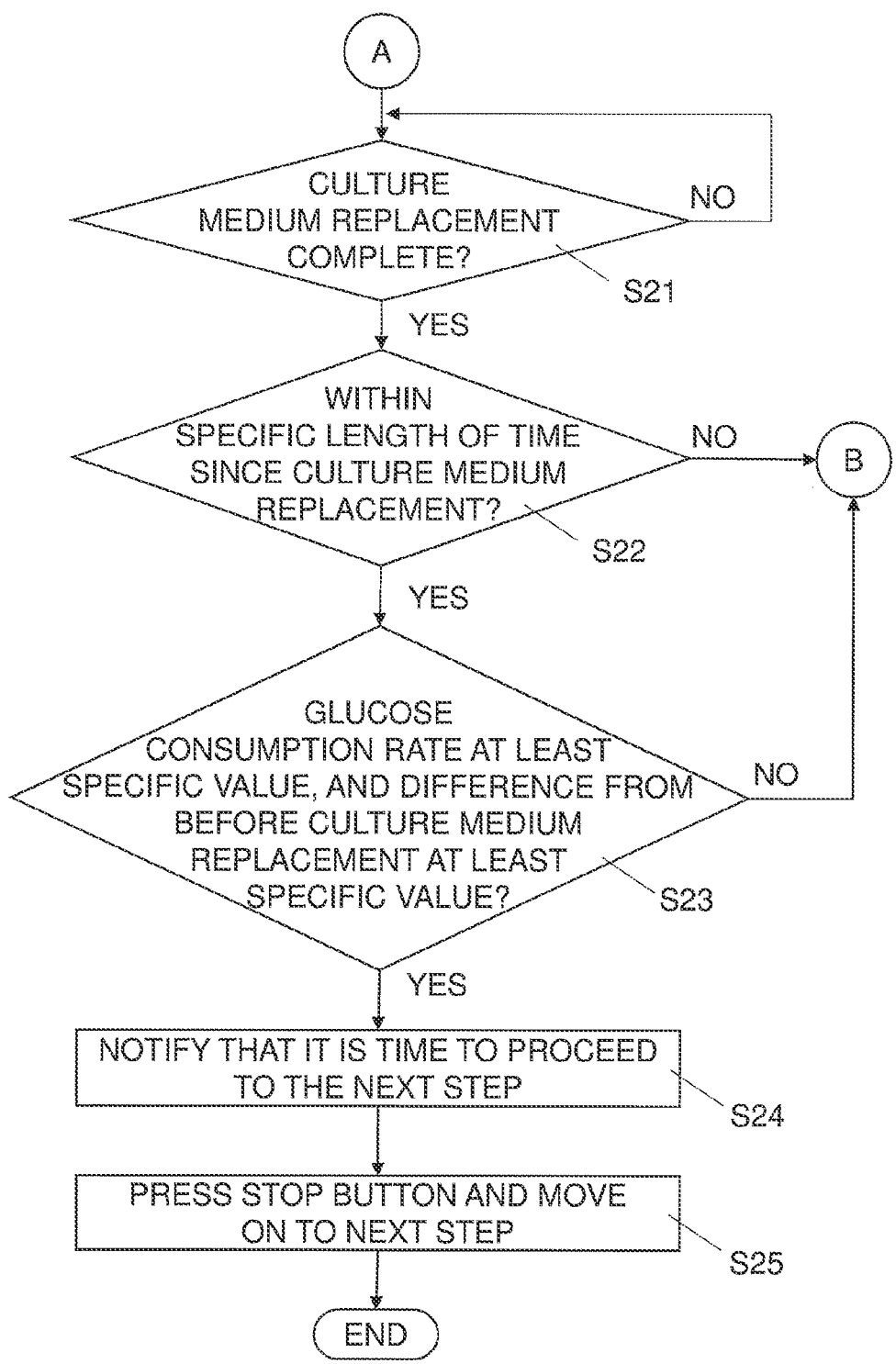
FIG. 12 is a flowchart showing the flow of processing in the next step transition determination after culture medium replacement in the cell culture control method according to yet another embodiment of the present invention.

For example, as shown in FIG. 12, step S26 may be omitted, and the next step transition determination processing may be performed by the processing from step S21 to step S25.

Figure 13:
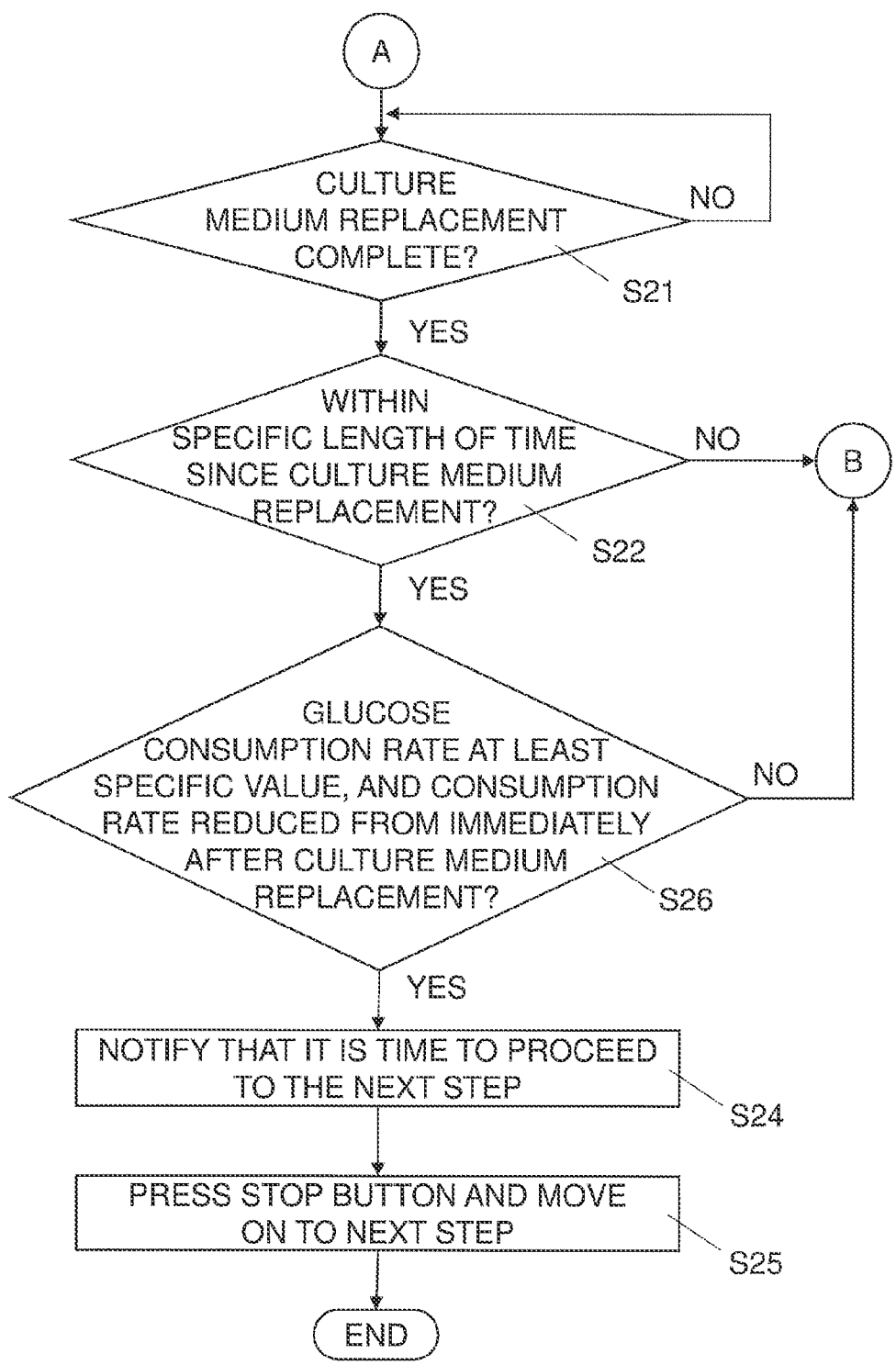
FIG. 13 is a flowchart showing the flow of processing in the next step transition determination after culture medium replacement in the cell culture control method according to yet another embodiment of the present invention.

Alternatively, as shown in FIG. 13, the next step transition determination processing may be performed by performing step S26 instead of step S23.

(E)

In the above embodiment, an example was given in which the next step transition determination unit 16 performed the next step transition determination processing when conditions 1 and 4, or conditions 2 and 4, out of the conditions 1 to 4 described above were satisfied. However, the present invention is not limited to this.

For example, if the resolution of the sensor is high, there is no risk that noise will be a factor, so the next step transition determination processing may be performed according to whether or not just condition 1 or condition 2 or condition 3 is satisfied, excluding condition 4 which is that "the consumption rate is at least a specific value (such as 0.1 mM/h)."

(F)

In the above embodiment, an example was given in which in conditions 1 to 4, thresholds were set, namely, that the consumption rate be a specific value or more (such as 1.0 mM/h) for a specific length of time (such as two hours), and the difference in consumption rate be at least a specific value (such as 1.0 mM/h). However, the present invention is not limited to this.

For example, the thresholds set for the conditions 1 to 4 can be changed as needed by the user, and may be changed to appropriate values according to the cell culture environment and various conditions.

(G)

In the above embodiment, an example was given in which the concentration of glucose contained in the culture medium X was measured and acquired by the measurement unit 12 connected to the sensor 21. However, the present invention is not limited to this.

For example, the next step transition determination processing may be performed by acquiring the measurement results for nutrients contained in the culture medium measured by an external measuring device, via wireless or wired communication.

(H)

In the above embodiment, an example was given in which 24 hours, 72 hours, 120 hours, and 144 hours (1 day, 3 days, 5 days, and 6 days) were set as the times at which the culture medium X was replaced. However, the present invention is not limited to this.

For example, the timing of culture medium replacement is not limited to the above-mentioned elapsed times, and other set times may be used.

Also, the culture medium replacement may be set to be performed in a shorter time span than in the above embodiment, such as in a few hours or a few minutes. It may be determined whether or not to proceed to the next step each time the culture medium is replaced in that short time span.

Also, in the above embodiment, the condition for culture medium replacement was that a preset culture medium replacement time had arrived, but something else besides the elapsed time may be set as the condition for replacing the culture medium, such as when the glucose consumption rate, the consumption acceleration, or the like satisfies a specific condition.

(I)

In the above embodiment, an example was given in which a button (STOP button 30e) for ending the current step was displayed on the display unit 19 along with a message prompting the user to proceed to the next step. However, the present invention is not limited to this.

For example, the button prompting to proceed to the next step is not limited to a configuration of being displayed on the display unit, and may be a separately provided button that is manually operated.

(J)

In the above embodiment, an example was given in which the cell culture control device of the present invention was provided in the PC 10. However, the present invention is not limited to this.

For example, instead of being in the form of a PC, dedicated devices may be provided as a cell culture control device, a measurement device, and a culture medium replacement device, and these may work together to perform the above-mentioned next step transition determination processing.

(K)

In the above embodiment, an example was given in which the concentration of glucose was measured as consumption information, as a nutrient contained in the culture medium X. However, the present invention is not limited to this.

For example, the device may be one that that acquires or measures lactose, amino acids, etc., as nutrients contained in the culture medium.

The invention claimed is:

1. A cell culture control device, comprising:
   a consumption amount information acquisition unit configured to acquire an amount of consumed nutrients from a result of continuously measuring a concentration of nutrients contained in a culture medium contained in a culture vessel;
   a consumption rate calculation unit configured to differentiate the amount of consumed nutrients acquired by the consumption amount information acquisition unit, and calculates the consumption rate at which the nutrients are consumed;
a culture medium replacement detection unit configured to detect that the culture medium contained in the culture vessel has been replaced or added; and
a next step transition determination unit configured to determine whether or not to proceed to a next step according to whether or not the consumption rate after replacement or addition of the culture medium calculated by the consumption rate calculation unit satisfies a specific condition when the culture medium replacement detection unit detects that the culture medium has been replaced or added.

2. The cell culture control device according to claim 1, wherein the next step transition determination unit determines to proceed to the next step when a difference in the consumption rate before and after replacing or adding the culture medium is equal to or greater than a specific value.

3. The cell culture control device according to claim 1, wherein the next step transition determination unit determines to proceed to the next step when the consumption rate becomes lower than immediately after replacing or adding the culture medium within a specific length of time.

4. The cell culture control device according to claim 1, further comprising a consumption acceleration calculation unit configured to differentiate the consumption rate calculated by the consumption rate calculation unit to calculate a consumption acceleration at which the nutrients are consumed,
wherein the next step transition determination unit determines to proceed to the next step when the consumption acceleration calculated by the consumption acceleration calculation unit becomes negative within a specific length of time.

5. The cell culture control device according to claim 2, wherein the next step transition determination unit determines to proceed to the next step when the consumption rate after replacement or addition of the culture medium is equal to or greater than a specific value.

6. The cell culture control device according to claim 1, further comprising a control unit configured to perform replacement or addition of the culture medium by controlling an introduction pump that supplies the culture medium to the culture vessel, and a discharge pump that discharges the culture medium from the culture vessel.

7. The cell culture control device according to claim 6, wherein the culture medium replacement detection unit detects that the culture medium has been replaced or added by detecting that the introduction pump and the discharge pump that have been driven to replace or add the culture medium contained in the culture vessel have stopped.

8. The cell culture control device according to claim 6, wherein the control unit performs replacement or addition of the culture medium once a specific length of time has elapsed.

9. The cell culture control device according to claim 1, wherein the culture medium replacement detection unit detects that the culture medium has been replaced or added when there is an input to restart a measurement after the measurement of the nutrients has been paused.

10. The cell culture control device according to claim 1, further comprising a display unit configured to display a message prompting a user to proceed to the next step when the next step transition determination unit determines to proceed to the next step.

11. The cell culture control device according to claim 1, further comprising a communication unit configured to transmit a notification prompting a user to proceed to the next step when the next step transition determination unit determines to proceed to the next step.

12. The cell culture control device according to claim 1, further comprising a measurement unit that is connected to a sensor immersed in the culture medium contained in the culture vessel, and is configured to continuously measure the concentration of the nutrients.

13. The cell culture control device according to claim 1, wherein, when the culture medium replacement detection unit detects that the culture medium contained in the culture vessel has been replaced,
the consumption amount information acquisition unit calculates the amount of consumed nutrients on the basis of the concentration of the nutrients contained in the culture medium.

14. The cell culture control device according to claim 1, wherein when the culture medium replacement detection unit detects that the culture medium contained in the culture vessel has been added,
the consumption amount information acquisition unit calculates the amount of consumed nutrients on the basis of the concentration of the nutrients contained in the culture medium and a volume of the culture medium.

15. A cell culture device, comprising:
the cell culture control device according to claim 1;
an introduction pump that is controlled by the cell culture control device and supplies the culture medium to the culture vessel; and
a discharge pump that is controlled by the cell culture control device and discharges the culture medium from the culture vessel.

16. A cell culture device, comprising:
the cell culture control device according to claim 14; and
an introduction pump that is controlled by the cell culture control device and supplies the culture medium to the culture vessel.

17. A cell culture control method, comprising:
acquiring the amount of consumed nutrients from the result of continuously measuring the concentration of the nutrients contained in the culture medium contained in the culture vessel by a consumption amount information acquisition unit;
calculating the consumption rate at which the nutrients are consumed by differentiating the amount of consumed nutrients acquired by the consumption amount information acquisition unit, by a consumption rate calculation unit;
detecting that the culture medium contained in the culture vessel has been replaced or added by a culture medium replacement detection unit; and
determining whether or not to proceed to the next step according to whether or not the consumption rate after replacement or addition of the culture medium calculated in the consumption rate calculation unit satisfies a specific condition by a next step transition determination unit, when it has been detected in the culture medium replacement detection unit that the culture medium has been replaced or added.

18. A cell culture control program that causes a computer to execute a cell culture control method comprising:

acquiring the amount of consumed nutrients from the result of continuously measuring the concentration of the nutrients contained in the culture medium contained in the culture vessel by a consumption amount information acquisition unit;

calculating the consumption rate at which the nutrients are consumed by differentiating the amount of consumed nutrients acquired by the consumption amount information acquisition unit, by a consumption rate calculation unit;

detecting that the culture medium contained in the culture vessel has been replaced or added by a culture medium replacement detection unit; and determining whether or not to proceed to the next step according to whether or not the consumption rate after replacement or addition of the culture medium calculated in the consumption rate calculation unit satisfies a specific condition by a next step transition determination unit, when it has been detected in the culture medium replacement detection unit that the culture medium has been replaced or added.

* * * * *